(12) United States Patent
Regan et al.

(10) Patent No.: US 12,005,969 B2
(45) Date of Patent: Jun. 11, 2024

(54) VEHICLE AERODYNAMIC IMPROVEMENT APPARATUS AND SYSTEM

(71) Applicant: FLEETAERO, LLC, Phoenix, AZ (US)

(72) Inventors: Jesse Regan, Basalt, CO (US); Richard P. Senatro, Scottsdale, AZ (US)

(73) Assignee: FleetAero, LLC, Phoenix, AZ (US)

( * ) Notice: Subject to any disclaimer, the term of this patent is extended or adjusted under 35 U.S.C. 154(b) by 262 days.

(21) Appl. No.: 17/506,032

(22) Filed: Oct. 20, 2021

(65) Prior Publication Data

US 2022/0041227 A1 Feb. 10, 2022

Related U.S. Application Data

(63) Continuation-in-part of application No. 16/576,507, filed on Sep. 19, 2019, now Pat. No. 11,155,311, which is a continuation of application No. 15/647,035, filed on Jul. 11, 2017, now Pat. No. 10,442,478, which is a continuation-in-part of application No. 15/093,733, filed on Apr. 7, 2016, now Pat. No. 9,708,017.

(51) Int. Cl.
*B62D 35/00* (2006.01)
*B62D 37/02* (2006.01)

(52) U.S. Cl.
CPC ......... *B62D 35/002* (2013.01); *B62D 35/001* (2013.01); *B62D 37/02* (2013.01)

(58) Field of Classification Search
CPC ..... B62D 35/002; B62D 35/001; B62D 37/02
USPC ...................................... 296/180.4
See application file for complete search history.

(56) References Cited

U.S. PATENT DOCUMENTS 3,960,402 A * 6/1976 Keck .................... B62D 35/001
                                                            105/1.2
3,999,797 A    12/1976 Kirsch et al.
4,022,508 A    5/1977  Kirsch et al.
4,142,755 A    3/1979  Keedy
(Continued)

FOREIGN PATENT DOCUMENTS

DE        4237458 A1 *  5/1994  ............. B62D 33/06
DE        4237458 A1    5/1994
(Continued)

OTHER PUBLICATIONS

Davis et al., 2014 Vehicle Technologies Market Report, Report 2014, 6th Edition, Oak Ridge National Laboratory.
TrailMobile Test: Jun. 1953.

*Primary Examiner* — Amy R Weisberg
*Assistant Examiner* — Dana D Ivey
(74) *Attorney, Agent, or Firm* — Noblitt & Newson, PLLC

(57) ABSTRACT

An aerodynamic device for attachment to a trailer of a tractor-trailer having a centerline, a trailer sidewall and a trailer door. The aerodynamic device comprises an airfoil and a flexible mounting system. The airfoil comprises a leading edge, a trailing edge, an inner surface, and an outer surface. The flexible mounting system comprises a door hinge, a mounting bracket, a trailer hinge and a door strap. The door hinge is coupled to the trailer door. The mounting bracket is coupled to the inner surface of the airfoil. The trailer hinge is coupled to the mounting bracket and the trailer sidewall. The door strap coupled to the door hinge at a first end and the mounting bracket at a second end.

16 Claims, 25 Drawing Sheets

(56) References Cited

U.S. PATENT DOCUMENTS

| | | |
|---|---|---|
| 4,236,745 A | 12/1980 | Davis |
| 4,257,641 A | 3/1981 | Keedy |
| 4,309,053 A | 1/1982 | Lett |
| 4,316,630 A | 2/1982 | Evans |
| 4,320,920 A | 3/1982 | Goudey |
| 4,403,804 A | 9/1983 | Elton et al. |
| 4,457,550 A | 7/1984 | Gielow et al. |
| 4,458,936 A | 7/1984 | Mulholland |
| 4,682,808 A | 7/1987 | Bilanin |
| 4,726,618 A | 2/1988 | Hansen |
| 4,789,117 A | 12/1988 | Paterson |
| 4,818,015 A | 4/1989 | Scanlon |
| 5,199,762 A | 4/1993 | Scheele et al. |
| 5,236,347 A | 8/1993 | Andrus |
| 5,240,306 A | 8/1993 | Flemming |
| 5,348,366 A | 9/1994 | Baker et al. |
| 5,375,903 A | 12/1994 | Lechner |
| 5,382,070 A | 1/1995 | Turner |
| 5,498,059 A | 3/1996 | Switlik |
| 5,842,734 A | 12/1998 | Lechner |
| 6,257,654 B1 | 7/2001 | Boivin et al. |
| 6,286,894 B1 | 9/2001 | Kingham |
| 6,309,010 B1 | 10/2001 | Whitten |
| 6,325,448 B1 | 12/2001 | Estrada et al. |
| 6,378,932 B1 | 4/2002 | Fasel et al. |
| 6,485,087 B1 | 11/2002 | Roberge et al. |
| 6,742,616 B2 | 6/2004 | Leban |
| 6,799,791 B2 | 10/2004 | Reiman et al. |
| 6,915,611 B2 | 7/2005 | Reiman et al. |
| 6,959,958 B2 | 11/2005 | Basford |
| 7,008,005 B1 | 3/2006 | Graham |
| 7,192,077 B1 | 3/2007 | Hilleman |
| 7,207,620 B2 | 4/2007 | Cosgrove et al. |
| 7,243,980 B2 | 7/2007 | Vala |
| 7,431,381 B2 | 10/2008 | Wood |
| 7,484,791 B1 | 2/2009 | Benton |
| 7,537,270 B2 | 5/2009 | O'Grady |
| 7,585,015 B2 | 9/2009 | Wood |
| 7,641,262 B2 | 1/2010 | Nusbaum |
| 7,748,771 B2 | 7/2010 | Distel et al. |
| 7,784,854 B2 | 8/2010 | Breidenbach |
| 7,794,011 B2 | 9/2010 | Kjellgren et al. |
| 7,845,709 B2 | 12/2010 | Browne et al. |
| 7,854,468 B2 | 12/2010 | Vogel et al. |
| 7,862,102 B1 | 1/2011 | Benton |
| 7,874,512 B2 | 1/2011 | Xu |
| 7,950,720 B2 * | 5/2011 | Skopic ............... B62D 35/001 296/180.1 |
| 7,976,096 B2 | 7/2011 | Holubar |
| 8,025,329 B1 | 9/2011 | Kron |
| 8,079,634 B2 | 12/2011 | Visser et al. |
| 8,091,950 B2 | 1/2012 | Corke et al. |
| 8,091,951 B1 | 1/2012 | Fitzgerald |
| 8,177,287 B2 | 5/2012 | Vogel et al. |
| 8,196,995 B2 | 6/2012 | Chen |
| 8,251,436 B2 | 8/2012 | Henderson et al. |
| 8,272,680 B2 | 9/2012 | Breidenbach |
| 8,360,507 B2 | 1/2013 | Benton |
| 8,360,509 B2 | 1/2013 | Smith |
| 8,382,194 B2 | 2/2013 | Wood |
| 8,579,357 B2 | 11/2013 | Nusbaum |
| 8,608,228 B2 | 12/2013 | Smith |
| 8,672,391 B1 | 3/2014 | Cobb |
| 8,684,447 B2 | 4/2014 | Henderson et al. |
| 8,770,650 B1 | 7/2014 | Brosseau |
| 8,864,214 B2 | 10/2014 | Alguera |
| 8,973,972 B2 | 3/2015 | Dieckmann et al. |
| 9,199,673 B2 | 12/2015 | Baker |
| 9,342,595 B2 | 5/2016 | Cheswick |
| 10,442,478 B2 | 10/2019 | Regan |
| 2007/0046067 A1 | 3/2007 | Verona |
| 2008/0048468 A1 | 2/2008 | Holubar |
| 2008/0157560 A1 | 7/2008 | Spector |
| 2010/0201153 A1 | 8/2010 | Pesotini |
| 2011/0037291 A1 | 2/2011 | Pickering |
| 2011/0095564 A1 | 4/2011 | Chen |
| 2013/0057020 A1 | 3/2013 | Burrell |
| 2014/0319872 A1 | 10/2014 | Kunkel |
| 2015/0097393 A1 | 4/2015 | Dieckmann et al. |

FOREIGN PATENT DOCUMENTS

| | | |
|---|---|---|
| DE | 19524825 A1 | 1/1997 |
| DE | 19960483 A1 | 6/2001 |
| DE | 102008036888 A1 | 2/2010 |
| DE | 202009014510 A1 | 2/2010 |
| WO | 2006060852 A1 | 6/2006 |
| WO | 2010089592 A1 | 8/2010 |
| WO | 2010112204 A1 | 10/2010 |

* cited by examiner

VEHICLE AERODYNAMIC IMPROVEMENT APPARATUS AND SYSTEM

CROSS-REFERENCE TO RELATED APPLICATIONS

This application is a continuation-in-part application of U.S. patent application Ser. No. 16/576,507, filed Sep. 19, 2019, and entitled "Vehicle Aerodynamic Improvement Apparatus and System," which is a continuation application of U.S. patent application Ser. No. 15/647,035, filed Jul. 11, 2017, now U.S. Pat. No. 10,442,478 and entitled "Vehicle Aerodynamic Improvement Apparatus and System," which is a continuation-in-part application of U.S. patent application Ser. No. 15/093,733, filed Apr. 7, 2016, now U.S. Pat. No. 9,708,017 and entitled "Vehicle Aerodynamic Improvement Apparatus and System" and incorporates the disclosure of each application by reference. To the extent that the present disclosure conflicts with any referenced application, however, the present disclosure is to be given priority.

BACKGROUND OF THE TECHNOLOGY

This technology relates to aerodynamic trucking systems. More particularly, this technology relates to providing a system of aerodynamic apparatus configured to minimize aerodynamic drag and maintain smoother air flow over highway-operated vehicles, particularly long-haul tractor-trailer vehicles.

Most large long-haul cargo trailers exhibit less than optimal aerodynamic performance during highway operation. At highway speeds, conventional trailers develop a substantial amount of turbulent airflow in the region between the axles below the trailer box and behind the trailer. This turbulence results in significant aerodynamic drag, increasing both fuel consumption and emissions at the motorized towing vehicle. Additionally, temporarily sustained vibration of external vehicle surfaces due to transient wind-force loading is often associated with premature wear, noise, and early failures within such aerodynamic vehicle structures. A system and method to improve the aerodynamic performance of long-haul transport vehicles in the above-noted areas is described below.

The technology relates to improving aerodynamics of a primary vehicle or a secondary vehicle towed by a primary vehicle. Despite advances in technology providing more fuel-efficient power generation for vehicles, efforts continue to strive for a more efficient vehicle overall. A large factor in vehicle efficiency lies in the aerodynamics of the vehicle. While the design of smaller road-going passenger vehicles adapts through continuous design revisions between model years, the road-going truck market, particularly the long-haul or Class 8 segment of the market has not been able to adapt as quickly. Also referred to as a "semi-truck" or "semi," long-haul trucks transport mass quantities of goods through the use of trailers sometimes in excess of 50 feet in length and 60,000 pounds of payload capacity. The modern semi-truck trailer has undergone little design improvement for aerodynamic efficiency over several decades. Furthermore, the average fuel economy of a road-going semi-truck towing a loaded trailer is only 7.2 miles per gallon (Davis, Stacy C. 2014 Vehicle Technologies Report. Oakridge, Tenn.: U.S. Dept. of Energy, 2014. ORNL/TM-2015/85). There are currently over 5.6 million semi-trailers registered for use in the United States alone. The lifespan of an average semi-trailer typically spans 12-15 years, as such the immediate redesign of the standard semi-trailer will do little to improve overall efficiency in the near-term. As a result, there is a need for a near-term solution that improves aerodynamic efficiency of semi-trailers in a cost-efficient manner.

Aerodynamic drag is a primary contributing factor to fuel consumption when operating a road-going truck and trailer at highway speeds. Friction drag and pressure drag are two variables surrounding aerodynamic drag. Friction drag surrounds the interaction of the ambient air and the surface of the trailer as it moves through it. However, the effects of friction drag are limited in comparative nature to pressure drag when considering a semi-trailer. Pressure drag is a dominant acting variable in the aerodynamic consideration of a semi-trailer. Pressure drag is caused by large pressure differentials in the wake of a trailer due to rapid flow separation creating turbulent flow characteristics. Turbulent flow characteristics can create such phenomena as a Karman vortex street, which is a repeating pattern of swirling vortices caused by the unsteady separation of flow of a fluid around blunt bodies. Such turbulent characteristics cause inefficient aerodynamic flow, due to increased pressure drag, and may even create unsafe oscillation of the trailer. In extreme cases this can result in destabilization and tip-over of the trailer and the primary vehicle.

During operation a driver must maneuver the truck and trailer combination during operation, including loading and unloading. Due to the length of the trailer, sometimes the driver may have difficulty navigating the trailer with various aerodynamic components attached thereto. As such, an aerodynamic component that is less vulnerable to external forces during operation including loading and unloading may be beneficial.

SUMMARY OF THE TECHNOLOGY

Efforts to improve aerodynamics of a vehicle such as a semi-trailer by addressing the aft end of the vehicle typically surrounds the improvement of flow separation to provide a more laminar and consistent flow further aft of the vehicle so as to prevent large pressure differentials which may cause eddy formation, vortices or other inefficient flow dynamics. In the improvement of the aerodynamics of a vehicle, it will be appreciated that the convergence of flow, post separation, is desired to converge quickly and with decreased turbulent flow characteristics.

In one embodiment, an apparatus for improving aerodynamics of a vehicle is disclosed. The apparatus includes: a plurality of stiffeners offset from each other; a first airfoil configured as a thin-form sheet; a second airfoil coupled to the first airfoil using the plurality of stiffeners, wherein a trailing edge of the first airfoil overlaps a leading edge of the second airfoil; an airflow inlet defined by a leading edge of the first airfoil and a pair of stiffeners of the plurality of stiffeners; and an airflow outlet defined by the trailing edge of the first airfoil, the leading edge of the second airfoil, and the pair of stiffeners.

In another embodiment, a system for improving aerodynamics of a vehicle is disclosed. The system includes: first and second aerodynamic units, each aerodynamic unit including a first airfoil configured as a thin-form sheet and a second airfoil interconnected to the first airfoil using a plurality of stiffeners, wherein a trailing edge of the first airfoil overlaps and or nearly overlaps a leading edge of the second airfoil, wherein the first and second aerodynamic units are configured to mount to side surfaces of the vehicle; and a third aerodynamic unit shaped in a convex form and configured to mount to a top surface of the vehicle.

In another embodiment, an apparatus for improving aerodynamics of a vehicle is disclosed. The apparatus includes: multiple means for stiffening and supporting, each means offset from the other means of the multiple means; means for creating an aerodynamic force; means for stabilizing the aerodynamic force created by the means for creating, the means for stabilizing coupled to the means for creating using the multiple means for stiffening and supporting, wherein a trailing edge of the means for creating partially overlaps a leading edge of the means for stabilizing; means for enabling air to flow in defined by a leading edge of the means for creating and the multiple means for stiffening; and means for enabling the air to flow out defined by the trailing edge of the means for creating, the leading edge of the means for stabilizing, and the multiple means for stiffening.

In another embodiment, an aerodynamic device for attachment to a trailer of a tractor-trailer having a centerline, a trailer sidewall and a trailer door. The aerodynamic device comprises an airfoil and a flexible mounting system. The airfoil comprises a leading edge, a trailing edge, an inner surface, and an outer surface. The flexible mounting system comprises a door hinge, a mounting bracket, a trailer hinge and a door strap. The door hinge is coupled to the trailer door. The mounting bracket is coupled to the inner surface of the airfoil. The trailer hinge is coupled to the mounting bracket and the trailer sidewall. The door strap is coupled to the door hinge at a first end and the mounting bracket at a second end.

In another embodiment, an aerodynamic device for attachment to a trailer of a tractor-trailer having a centerline, a trailer sidewall, and a trailer door. The aerodynamic device comprises an airfoil and a flexible mounting system. The airfoil comprises a leading edge, a trailing edge, an inner surface, and an outer surface. The flexible mounting system comprises a door hinge, a mounting bracket, a trailer hinge, and a door strap. The door hinge may be coupled to the trailer door. The mounting bracket may comprise upper and lower rotary brackets, a hinge plate, a hinge arm, and a resilient spring. The upper and lower rotary brackets may be coupled to the inner surface of the airfoil. The hinge plate may be rotatably coupled to a first end of the upper and lower rotary brackets. The hinge arm may comprise first and second ends, wherein the first end is coupled to the hinge plate. The resilient spring may comprise first and second ends, wherein the first end of the resilient spring is coupled to a mounting portion of the hinge plate. The trailer hinge may be coupled to the second end of the hinge arm and the trailer sidewall. The door strap may be coupled to the door hinge at a first end and the second end of the resilient spring at a second end.

Other features and advantages of the present disclosure should be apparent from the present description which illustrates, by way of example, aspects of the present disclosure.

BRIEF DESCRIPTION OF THE DRAWINGS

A more complete understanding of the present technology may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in a different order are illustrated in the figures to help to improve understanding of embodiments of the present technology.

DETAILED DESCRIPTION

Methods and apparatus for providing an aerodynamic trucking system designed to reduce aerodynamic drag and maintain smoother air flow over highway-operated vehicles, particularly long-haul tractor-trailer vehicles. Various representative implementations of the present technology may be applied to any system for reducing aerodynamic drag and maintaining smoother air flow over highway-operated vehicles, particularly long-haul tractor-trailer vehicles.

The present technology surrounds an apparatus and system for the aerodynamic improvement of a vehicle, typically surrounding airflow near a rear-ward portion of the vehicle. Embodiments of the present disclosure describe an apparatus and a system typically mounted to a rear-ward portion of a semi-trailer for aerodynamic improvement. The aerodynamic improvements as applied mitigate inefficient aerodynamic phenomena. Such aerodynamic phenomena may include but is not limited to: Karman vortex street, rapid flow separation and turbulent flow characteristics.

The present technology may be described in terms of functional block components and various processing steps. Such functional blocks may be realized by any number of components configured to perform the specified functions and achieve the various results. For example, the present technology may employ various types of materials, connectors, panel, mounts, and the like for aerodynamic trucking systems, and the system described is merely one exemplary application for the technology.

Methods and apparatus for providing an aerodynamic trucking system designed to reduce aerodynamic drag and maintain smoother air flow over highway-operated vehicles, particularly long-haul tractor-trailer vehicles. Various representative implementations of the present technology may be applied to any system for reducing aerodynamic drag and maintaining smoother air flow over highway-operated vehicles, particularly long-haul tractor-trailer vehicles.

Despite a general conformity of trailer designs within the trailer industry, variations exist between the offerings of the various trailer and component manufacturers. Aerodynamic trucking systems are typically designed to be universally adaptable to most conventional semi-type cargo trailers. To accommodate specific aerodynamic variations within the various trailer configurations, the aerodynamic device may be designed to be adjustably mountable to the rear of the cargo trailer.

Figure 1:
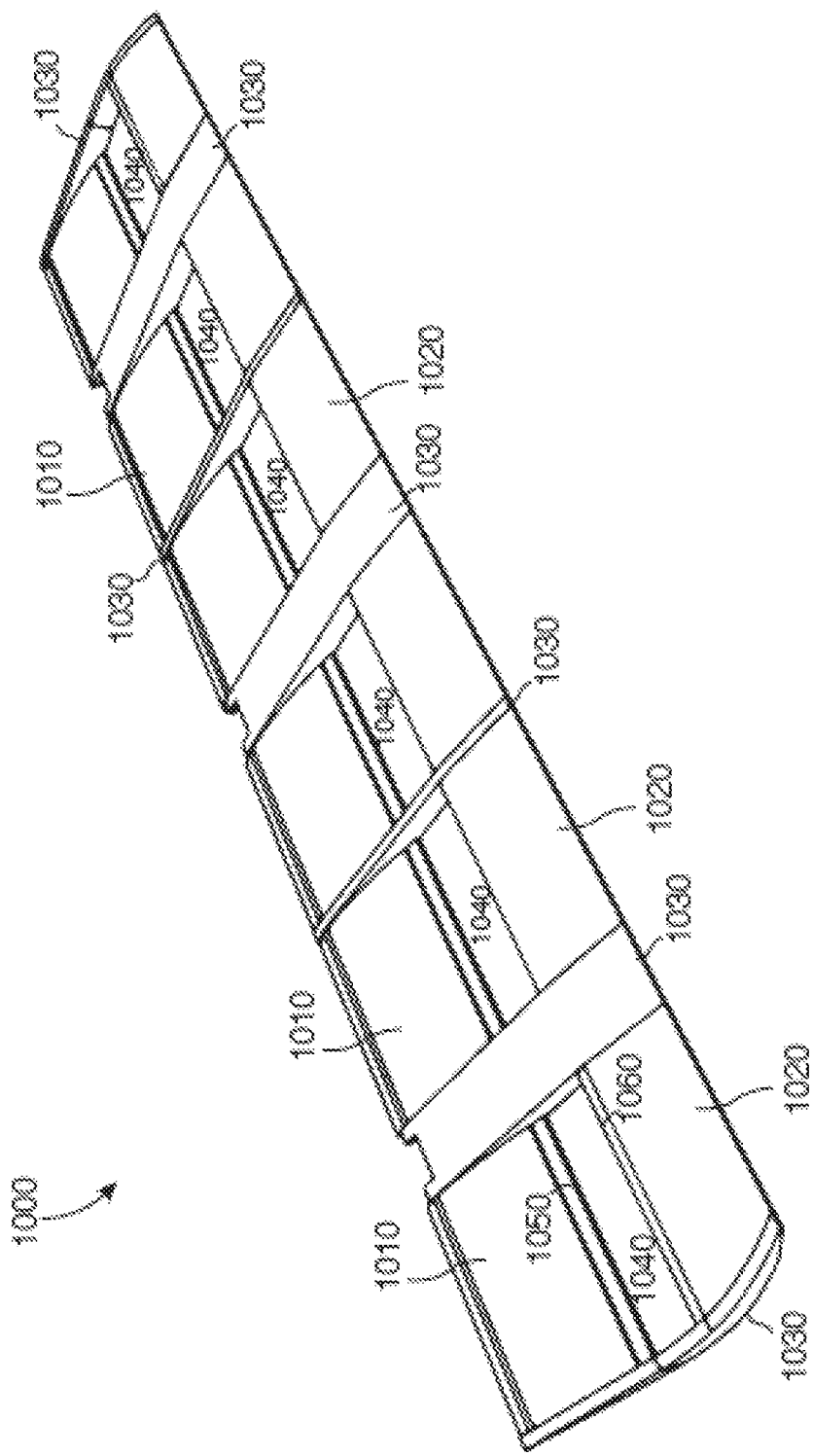
FIG. 1 is a perspective view of an outward face of a planar form in accordance with an exemplary embodiment of the present technology.

An apparatus, as shown in FIG. 1 comprises an aerodynamic device 1000 further comprising an airfoil 1010 and a stabilizer 1020 interconnected by a series of stiffeners 1030 spanning between them. The apparatus further comprises a plurality of apertures 1040 defined by a trailing edge 1050 of the airfoil 1010, a leading edge 1060 of a stabilizer 1020, and two stiffeners 1030. In one embodiment, an airfoil is defined as a body which creates an aerodynamic force when moved through a fluid such as air.

Figure 2:
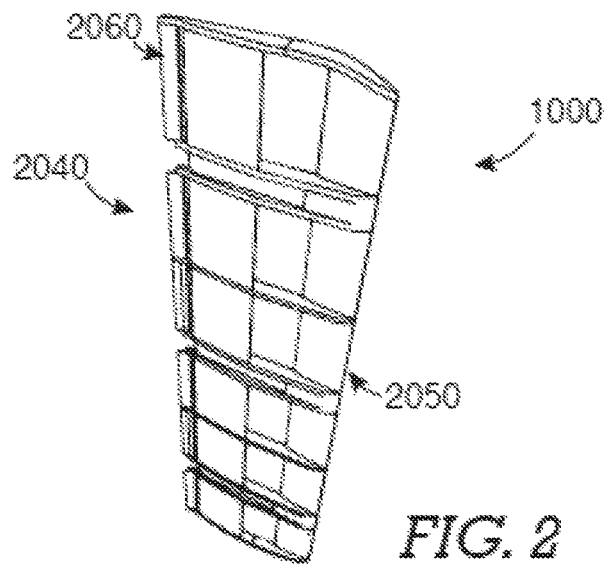
FIG. 2 is a perspective view of an inward face of a planar form in accordance with an exemplary embodiment of the present technology.
Figure 3:
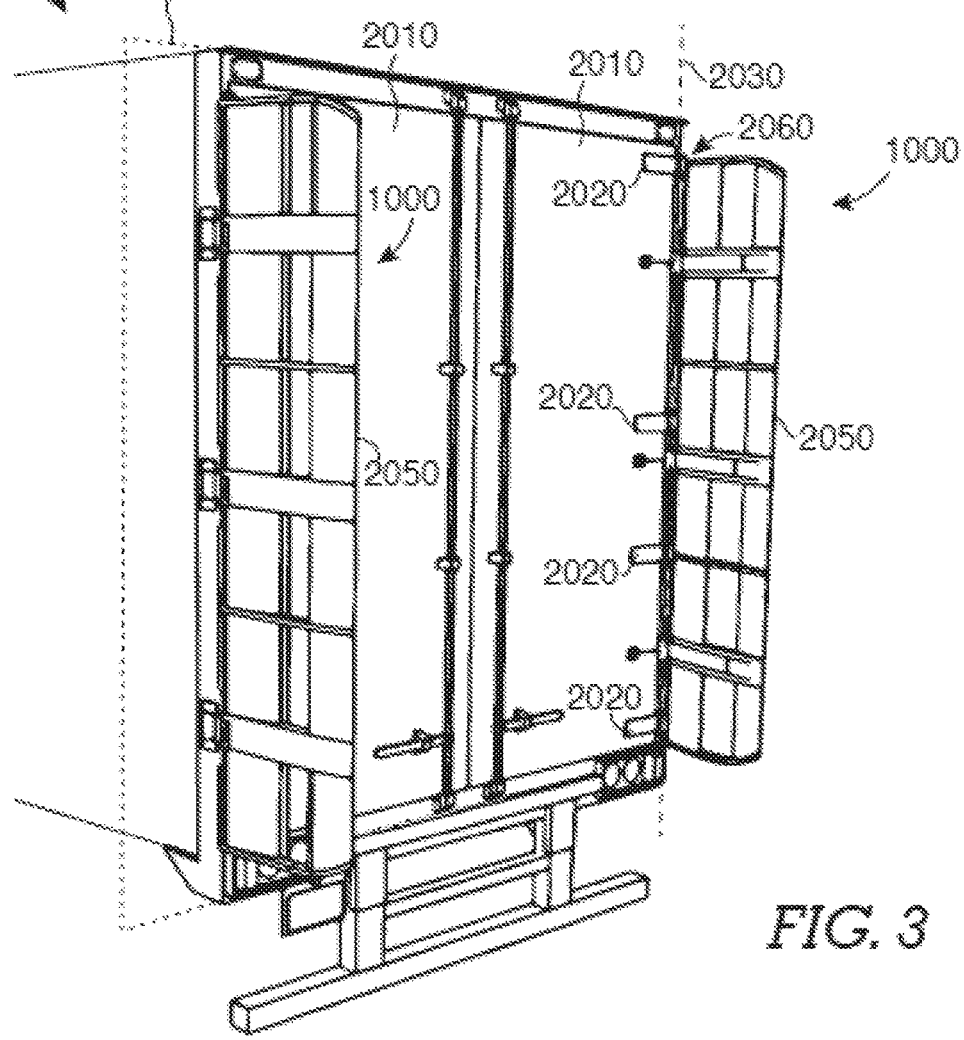
FIG. 3 is a perspective view of a planar forms attached to a vehicle in accordance with an exemplary embodiment of the present technology.
Figure 4:
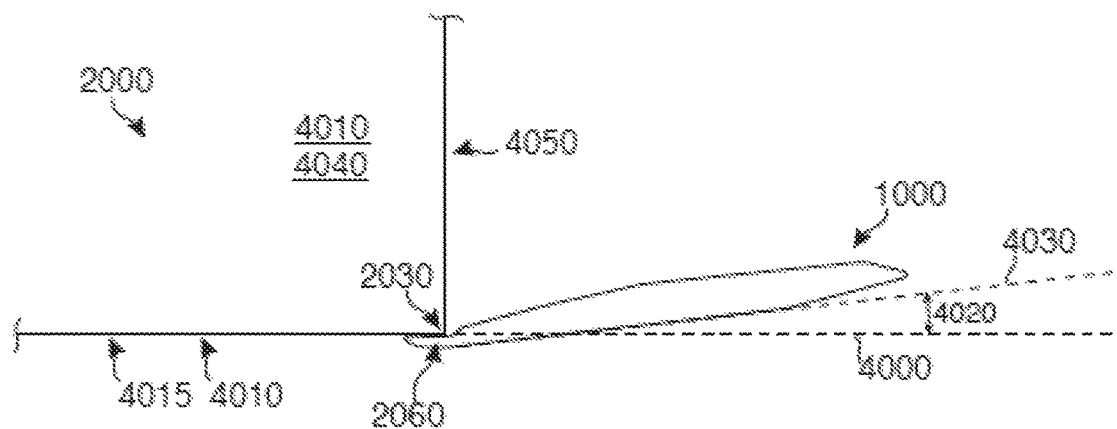
FIG. 4 is a top view of a planar form attached to a trailing edge of a vehicle accordance with an exemplary embodiment of the present technology.

Certain embodiments of an apparatus, as shown in FIG. 2 and FIG. 3 comprise an aerodynamic device 1000 having a leading edge 2040 and a trailing edge 2050. The aerodynamic device 1000, referring to FIG. 2, further comprises an edge-recess 2060 near the aerodynamic device leading edge 2040. Referring to FIG. 4, the edge-recess 2060 of certain embodiments is configured to mate with a vertical trailing edge 2030 of a vehicle 2000. Referring to FIG. 3, it will be appreciated that certain vehicles 2000 have door hinges 2020 associated with doors 2010 coincident with an aft-plane 2070. Referring again to FIG. 3, an edge-recess 2060 of an aerodynamic device 1000 is configured to provide clearance between the aerodynamic device 1000 and a door hinge 2020 proximate to the trailing edge 2030 of a vehicle 2000.

In certain embodiments as shown in FIG. 4, an apparatus for the aerodynamic improvement of a vehicle comprising an aerodynamic device 1000 is mated to a vertical trailing edge 2030 of a vehicle 2000 disposed at a device offset angle 4020 from a reference plane 4000.

In certain embodiments, a reference plane 4000 is coincident with an external planar surface 4010 of a vehicle 2000. The reference plane 4000 in the context of a semi-trailer is coincident with an external planar surface 4010 of the semi-trailer, such as a side-surface 4015 or top surface 4040. It may be desired to attach the aerodynamic device 1000 to the vertical trailing edge 2030 of the vehicle 2000 with the aerodynamic device 1000 directed inward toward the vehicle. It may be further desired to direct the aerodynamic device 1000 inward toward the vehicle at a device offset angle 4020 of 7-degrees inward from a reference plane 4000.

Figure 5A:
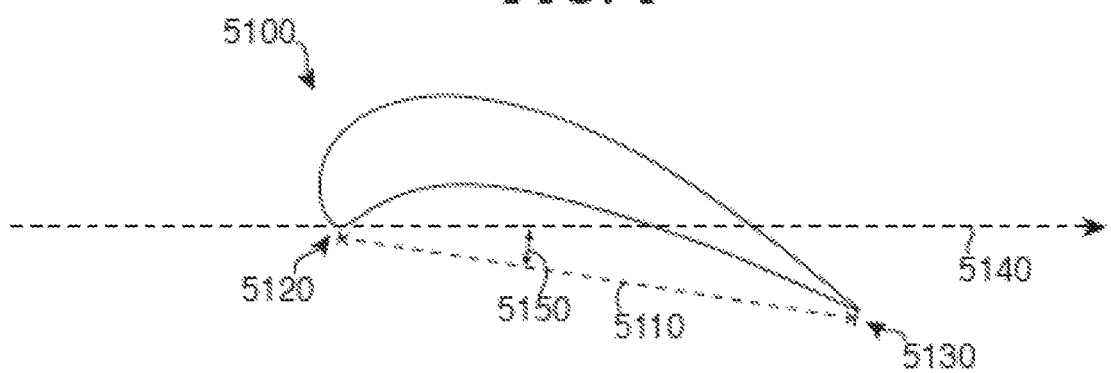
FIG. 5A shows a typical air-foil.

As shown in FIG. 5A, it will be appreciated by those skilled in the art that a chord 5110, as used in reference to an aerodynamic form 5100, refers to a measurement aligned with the flow profile of the aerodynamic form 5100. The chord 5110 spans from a leading edge 5120 to a trailing edge 5130 of the aerodynamic form 5100. The angle of attack 5150 will be appreciated by those skilled in the art as indicating an angle between the general airflow 5140, also referred to as relative wind, and the chord 5010. In certain embodiments discussed herein, the airflow 5140 is parallel to a reference plane of a vehicle.

Figure 5B:
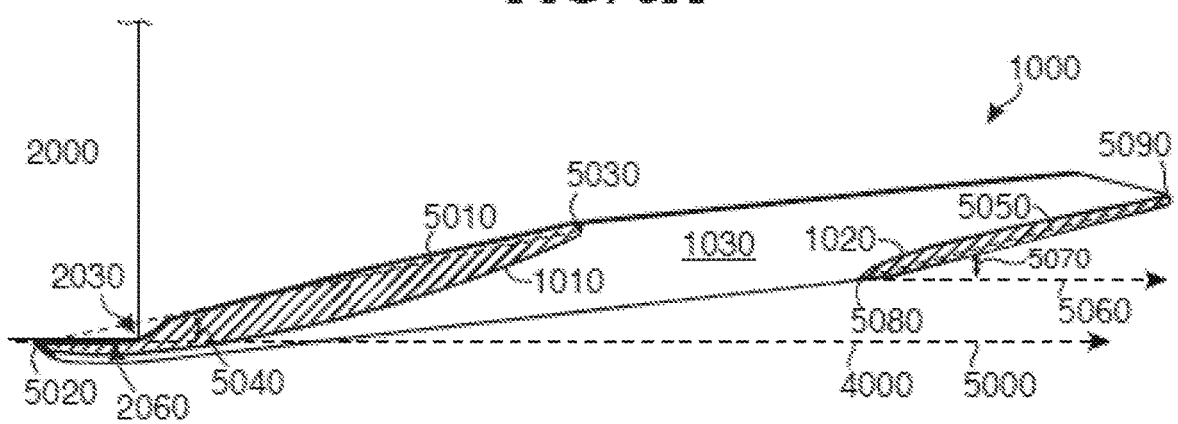
FIG. 5B is a cross-sectional view of an air foil form and a stabilizer component of a planar form in accordance with an exemplary embodiment of the present technology.

Certain embodiments, referring to FIG. 5B, comprises an aerodynamic device 1000 further comprising an airfoil 1010, a stabilizer 1020, a stiffener 1030 and an edge-recess 2060. The airfoil 1010 has an airfoil chord 5010 spanning from an airfoil leading edge 5020 to an airfoil trailing edge 5030. The stabilizer 1020 has a stabilizer chord 5050 spanning from a stabilizer leading edge 5080 to a stabilizer trailing edge 5090. In such embodiments the edge-recess 2060 is configured to interface with a trailing vertical edge 2030 of a vehicle 2000. With the edge-recess 2060 remaining parallel to a reference plane 4000 of the vehicle 2000, the airfoil angle of attack 5040 and stabilizer angle of attack 5070 may be disposed at an angle greater than zero. It may also be desired for the airfoil angle of attack 5040 and stabilizer angle of attack 5070 to be set at different values. It may be further desired to have the stabilizer leading edge 5080 offset laterally inward from the reference plane 4000.

Figure 6:
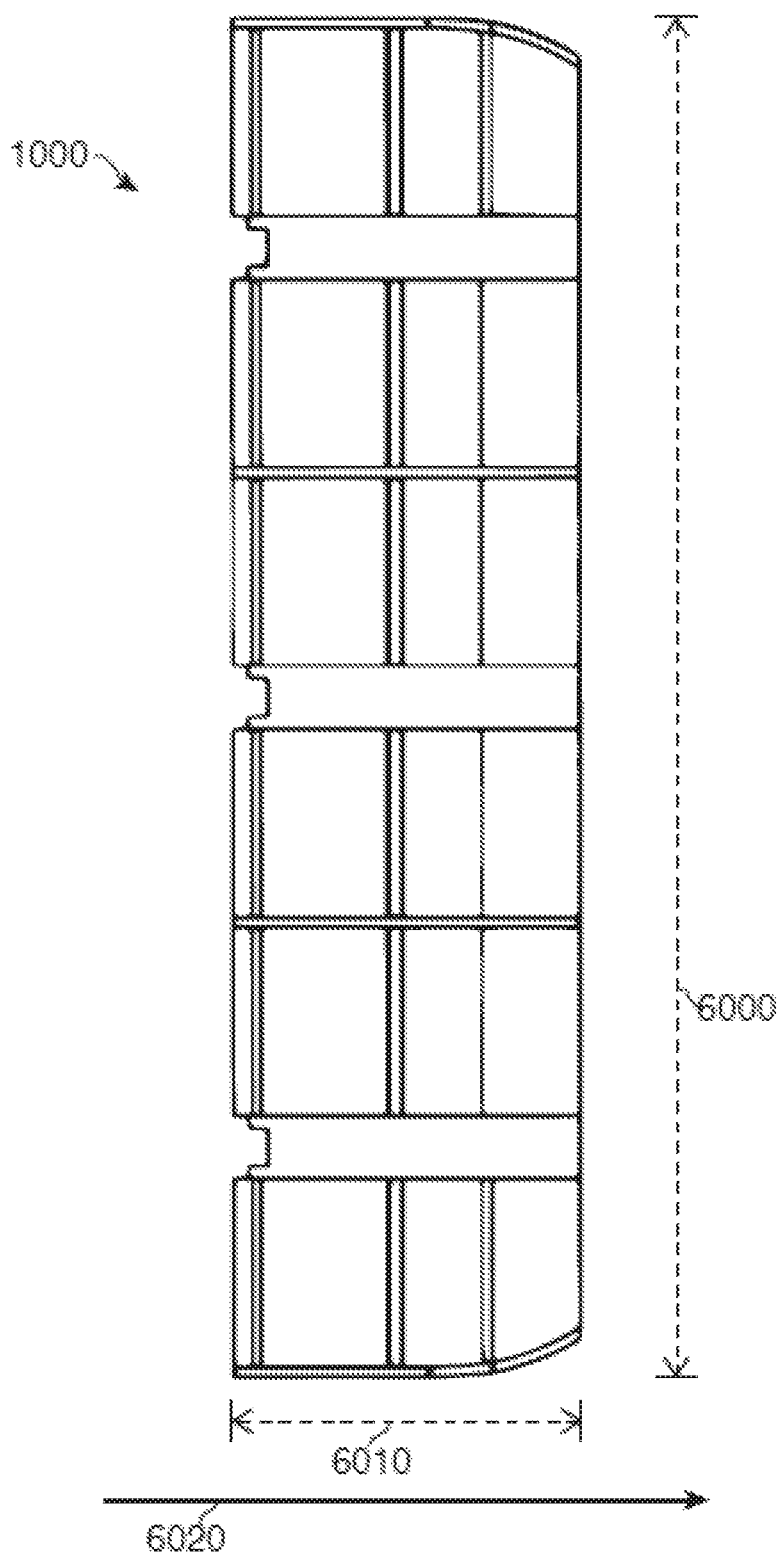
FIG. 6 is a plan view of a planar form in accordance with an exemplary embodiment of the present technology.

In certain embodiments, as shown in FIG. 6, for the aerodynamic improvement of a vehicle further comprising an aerodynamic device 1000 is configured for fixation proximal to a trailing vertical edge of a semi-trailer. In a variation of such embodiments, the length 6000 of the aerodynamic device, spans 271.7 cm (107 inches) and the width 6010 spans 68.6 cm (27 inches). In such embodiments, the width of the aerodynamic device or portion thereof extends rearward, in the direction of general airflow 6020 and away from the semi-trailer.

Figure 7A:
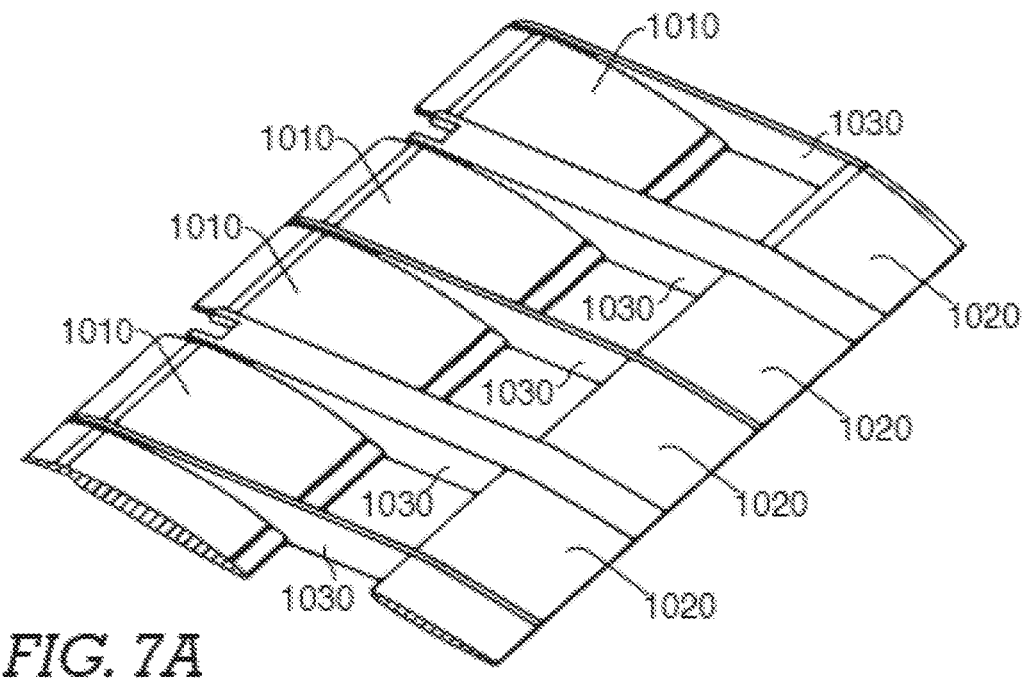
FIG. 7A is a perspective cross-sectional view of a planar form in accordance with an exemplary embodiment of the present technology.
Figure 7B:
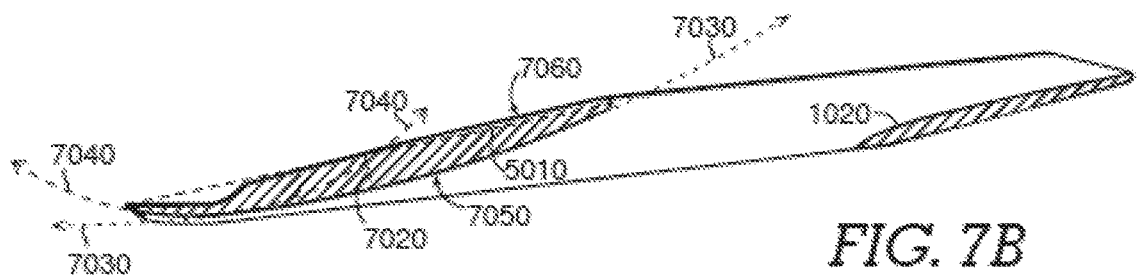
FIG. 7B is a cross-sectional view of a planar form in accordance with an exemplary embodiment of the present technology.

Certain embodiments of an apparatus comprising an aerodynamic device 1000, as shown in FIG. 7A, further comprises an airfoil 1010 in coordination with a stabilizer 1020 interconnected by a plurality of stiffeners 1030. Referring to FIG. 7B, an airfoil 1010 has a chord length 5010 of 33.8 cm (13.3 inches) and a maximum thickness 7020 of approximately 2.5 cm (1 inch). The airfoil 1010 has an airfoil primary surface 7050 as defined by an airfoil leading arc 7040 of radius of 61 cm (24 inches) coincident with the airfoil leading edge 2040. The airfoil primary surface is further defined by an airfoil trailing arc 7030 of radius of 121.9 cm (48 inches), such that the airfoil trailing arc 7030 is coincident with the airfoil trailing edge 5030 and tangential to the airfoil leading arc 7040. In certain embodiments, an airfoil 1010 has a substantially planar secondary airfoil surface 7060. In such embodiments, the airfoil angle of attack 5040 is 11.5-degrees from a reference line defined by the edge recess 2060 configured to interface with a reference plane 4000 of a vehicle 2000 as shown in FIG. 5B. In such embodiments, referring to FIG. 7C, the airfoil 1010 leading edge 2040 is coincident with the aerodynamic device leading edge 2040.

Figure 7C:
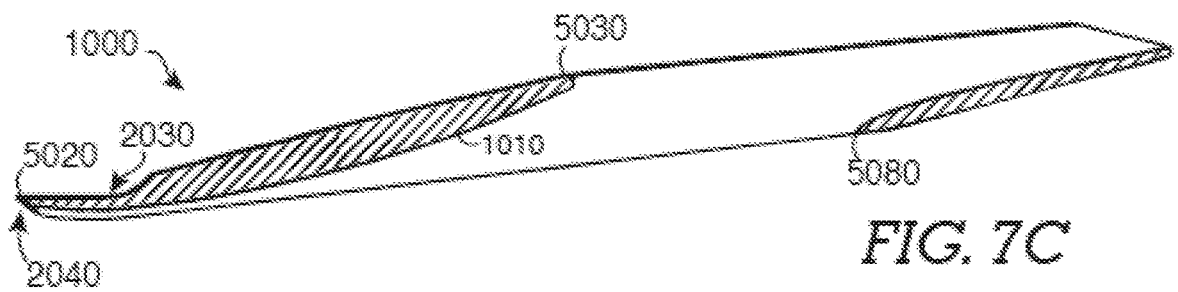
FIG. 7C is a cross-sectional view of a planar form in accordance with an exemplary embodiment of the present technology.
Figure 7D:
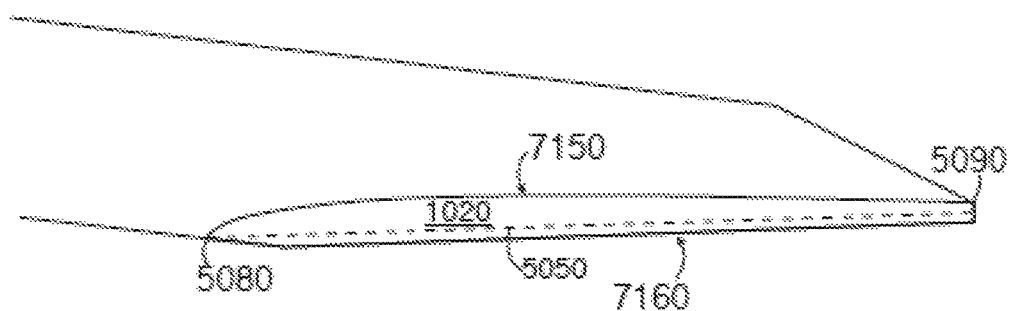
FIG. 7D is a cross-sectional magnified view of a stabilizer component of a planar form in accordance with an exemplary embodiment of the present technology.
Figure 7E:
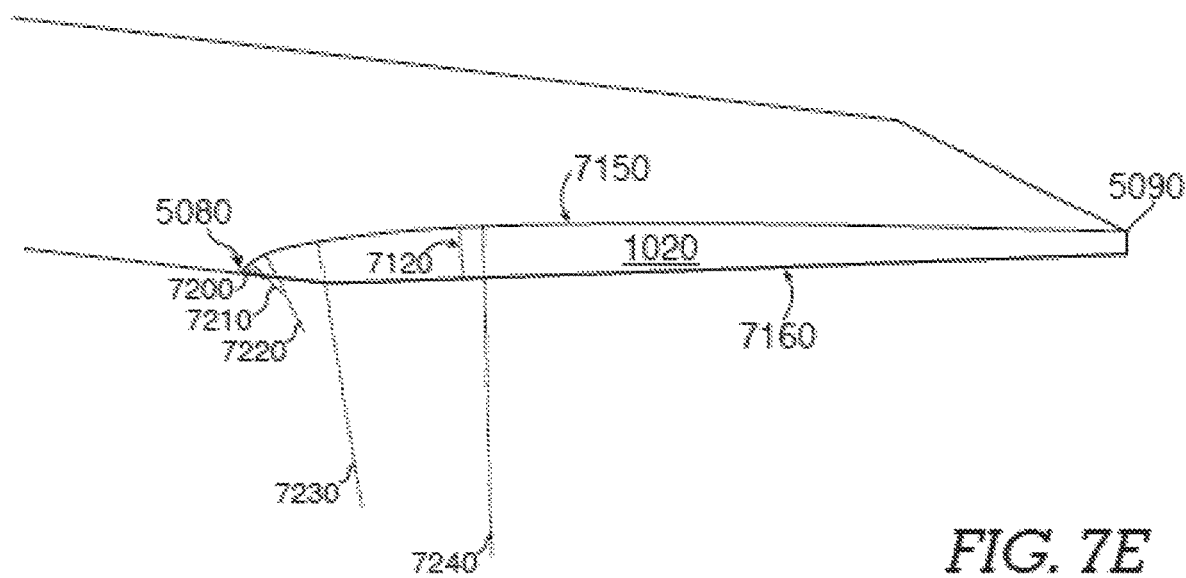
FIG. 7E is a cross-sectional magnified view of a stabilizer component of a planar form in accordance with an exemplary embodiment of the present technology.

Referring to FIG. 7D and FIG. 7E, certain embodiments of a stabilizer 1020 has a primary stabilizer surface 7150 and a substantially planar secondary stabilizer surface 7160. In such embodiments, a stabilizer 1020 has stabilizer chord 5050 of length 19.4 cm (7.62 inches) and a stabilizer maximum thickness 7120 of 1.27 cm (0.5 inch). A primary stabilizer airflow surface 7150 is defined by a stabilizer leading edge 5080 with a 0.51 cm (0.2 inch) leading edge arc 7200 connected to a series of tangentially interconnected arcs spanning from the stabilizer leading edge 5080 to the stabilizer trailing edge 5090. Following the leading edge arc 7200 is a first stabilizer arc 7210 of 1.0 cm (0.4 inch), then a second stabilizer arc 7220 of 1.9 cm (0.75 inch), a third stabilizer arc 7230 of 7.62 cm (3 inches), and a fourth stabilizer arc 7240 of 88.9 cm (35 inches) extending to a stabilizer trailing edge 5090. The stabilizer trailing edge 5090 of such embodiments has a thickness 1.0 cm (0.4 inch).

Figure 7F:
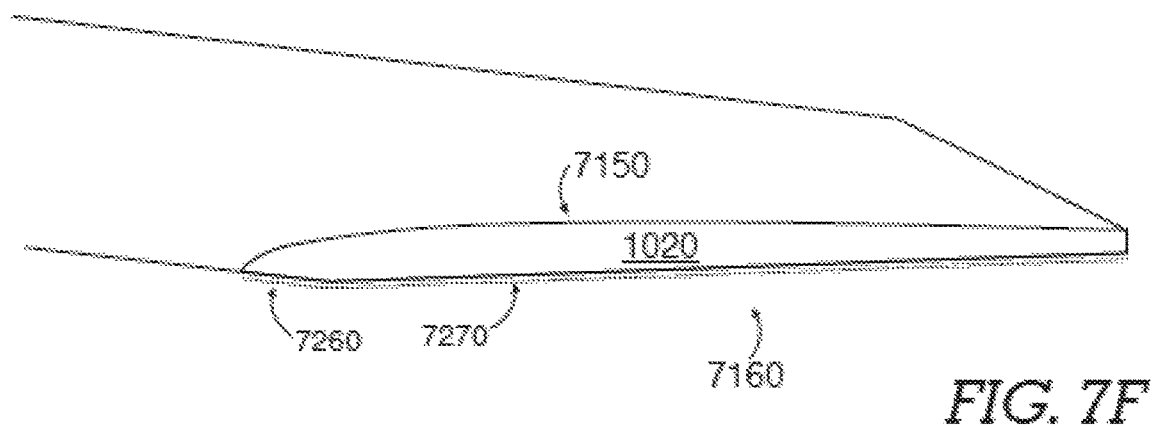
FIG. 7F is a cross-sectional magnified view of a stabilizer component of a planar form in accordance with an exemplary embodiment of the present technology.

Referring to FIG. 7F, in certain embodiments, the secondary stabilizer surface 7160 comprises two planar segments having a first planar segment 7260 of 1.9 cm (0.75 inch) and a second planar segment 7270 of 17.2 cm (6.8 inches). In certain embodiments, as shown in FIG. 7c, the stabilizer is disposed such that the stabilizer leading edge 5080 is 49.5 cm (19.5 inches) laterally from the airfoil leading edge 2040 and offset 3.6 cm (1.4 inches) from the edge recess 2030. In such embodiments, the angle of attack of the stabilizer is disposed at an angle of 14-degrees from the reference line.

It will be appreciated to those skilled in the art that the form, angle of attack, size and location of an airfoil and a stabilizer may vary between vehicle applications, intended speed of vehicle and general environment in which the vehicle operates in based on aerodynamic optimization practices.

Figure 8:
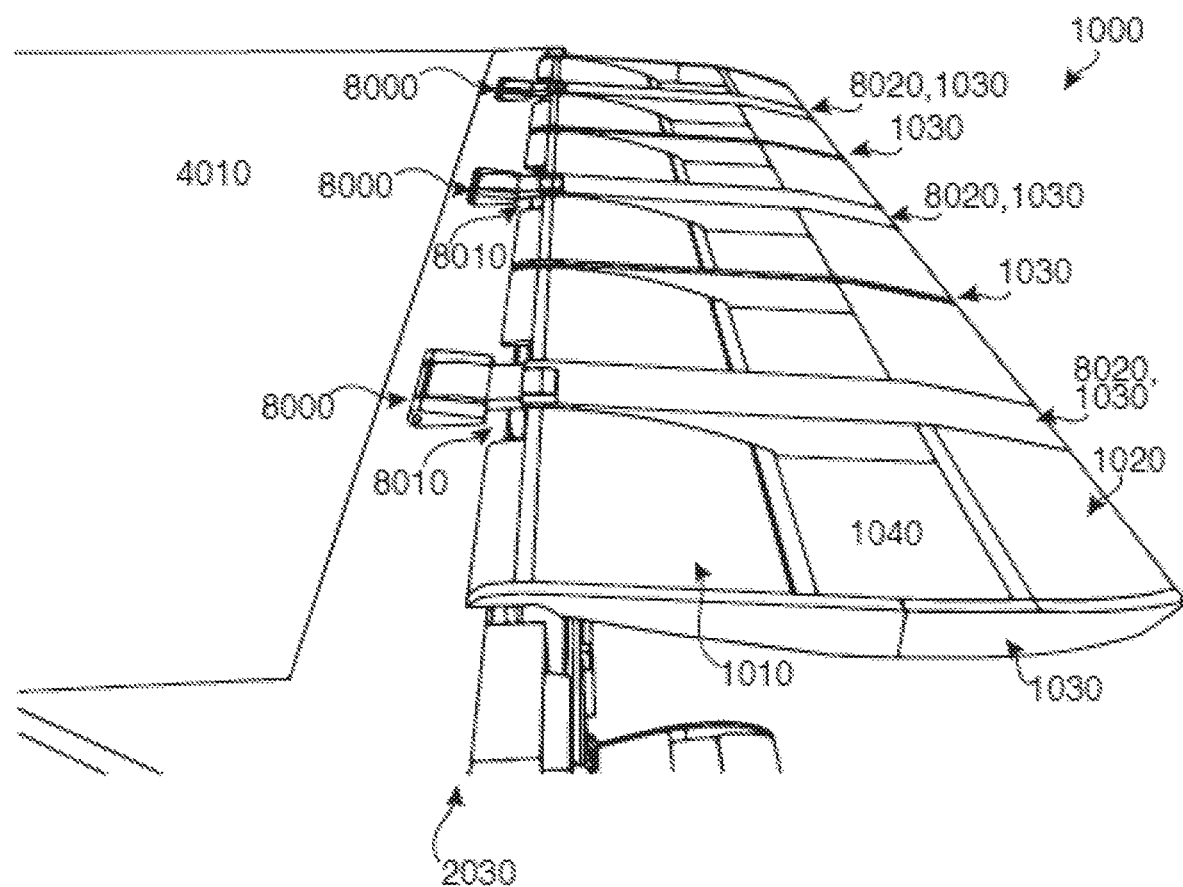
FIG. 8 is a bottom perspective view of a planar form attached to a vehicle in accordance with an exemplary embodiment of the present technology.

An apparatus, as shown in FIG. 8, comprising an aerodynamic device 1000 with stiffeners 1030, an airfoil 1010 and stabilizer 1020. In such an embodiment, a stiffener 1030 further comprises a mounting stiffener 8020. Mounting stiffeners 8020 are configured to affix to the vertical trailing edge 2030 of a vehicle using a hinged mount 8000 affixed to a vertical trailing edge 2030 of a vehicle 2000.

Figure 9A:
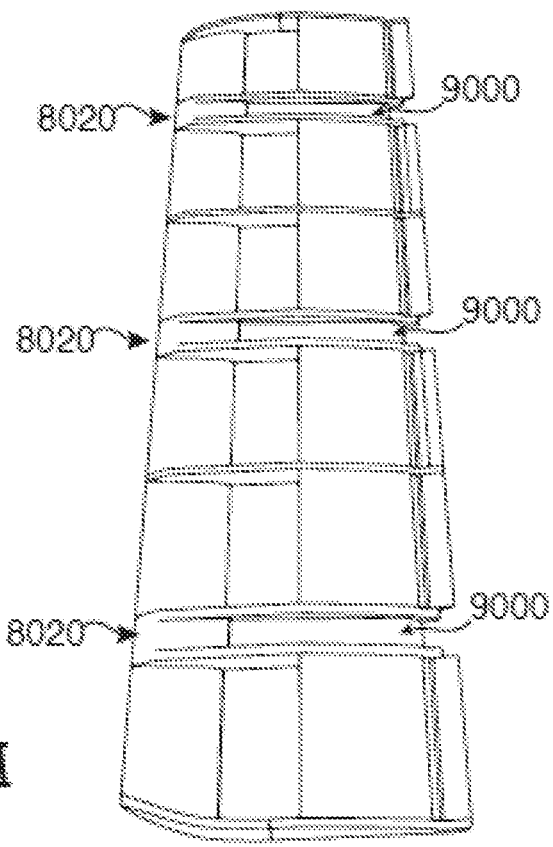
FIG. 9A is a perspective view of an inward face of a planar form in accordance with an exemplary embodiment of the present technology.
Figure 9B:
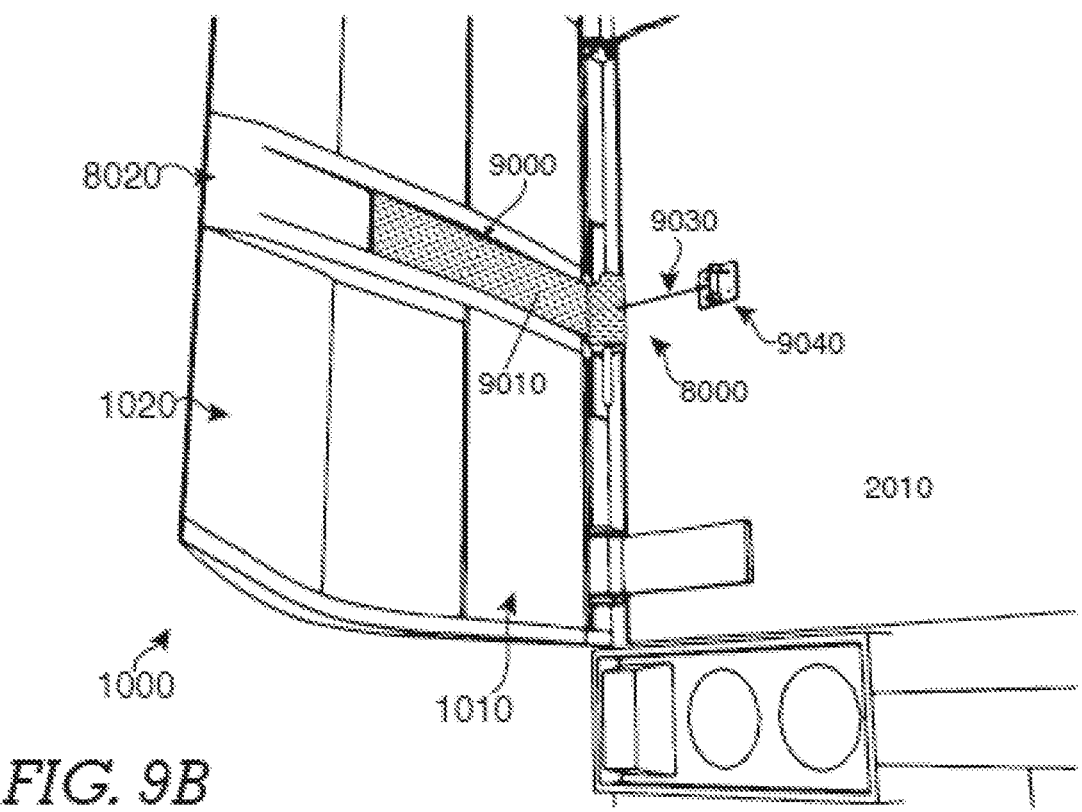
FIG. 9B is a perspective view of a rear portion of a vehicle having a planar form in accordance with an exemplary embodiment of the present technology.

In certain embodiments of the present disclosure, as shown in FIG. 9A, comprise an aerodynamic device 1000 with a plurality of mounting stiffeners 8020. Referring to FIG. 9A, it may be so desired to configure a mounting stiffener 8020 with a channel recess 9000 longitudinally along the length on the inward side of the mounting stiffener 8020. Referring to FIG. 9B, the hinged mount 8000 comprises a brace structure 9010 configured to interface with and be affixed within a channel recess 9000 of the mounting stiffeners 8020. Referencing FIG. 8, the rotative positioning provided by the hinged mounts 8000 allow movement of the aerodynamic device 1000 to prevent the aerodynamic device 1000 from interfering with the swing of a door 2010 opening outward. As shown in FIG. 8, it may be desired in certain embodiments for the aerodynamic device 1000 to further comprise clearance notches 8010 configured to allow clearance around a hinged mount 8000, preventing interference between the aerodynamic device 1000 and the hinged mount 8000.

Certain embodiments of an apparatus, referring to FIG. 9B are configured for use with a vehicle 2000 with aft-plane mounted doors 2010 which swing outward. The apparatus comprising an aerodynamic device 1000 and hinged mounts 8000, further comprises a tensile component 9030. The tensile component 9030 provides tensile constraint to the aerodynamic device 1000, maintain a maximum predetermined angular offset from the aft-plane 2070. In such embodiments, a first end of the tensile component 9030 is affixed to an inward facing surface the aerodynamic device 1000 and a second end of the tensile component 9030 is affixed to an anchor component 9040. The anchor component 9040 is affixed to a planar surface such as a door 2010, as may be the case with a semi-trailer. In such embodiments, the aerodynamic device is permitted to rotate outwardly in conjunction with the outward swing of the door 2010 to prevent interference when the door 2010. It may be desired in such embodiments for the hinge mechanism to have an intermediate mechanical stop to prevent the inward rotation of the aerodynamic device beyond the predetermined angular separation from the aft-plane. It may also be desired for the tensile component 9030 to be configured for easy detachment.

Figure 9C:
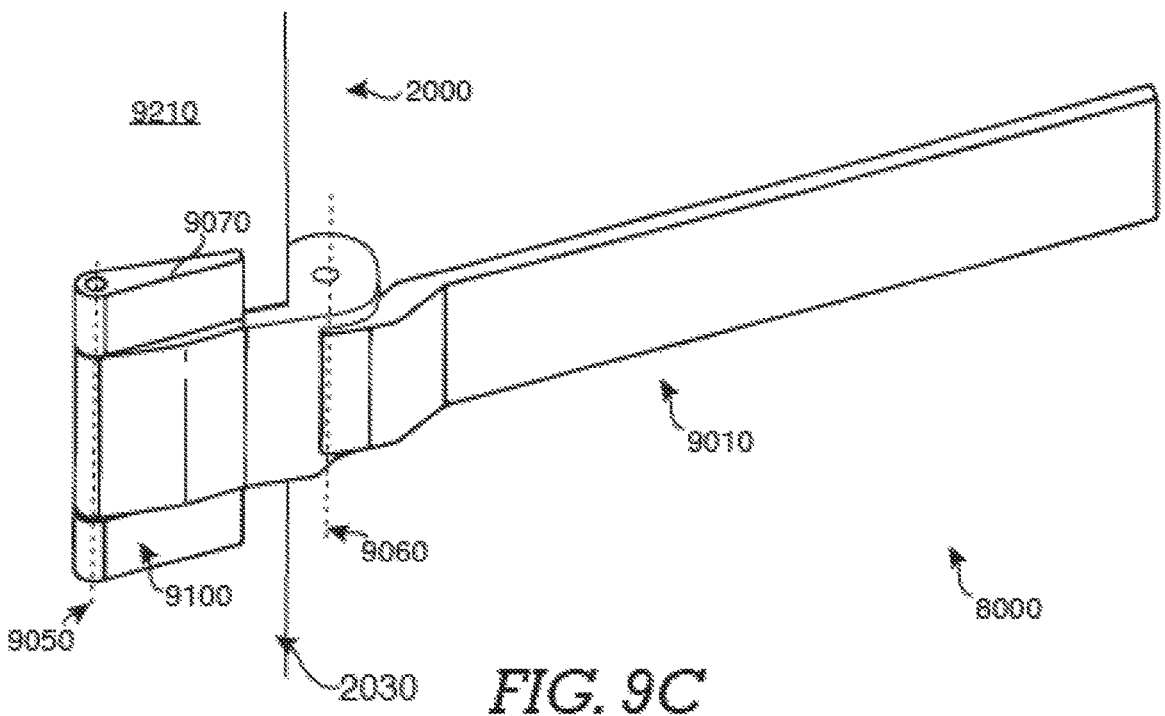
FIG. 9C is a perspective view of a hinge attached to a vehicle in accordance with an exemplary embodiment of the present technology.
Figure 9D:
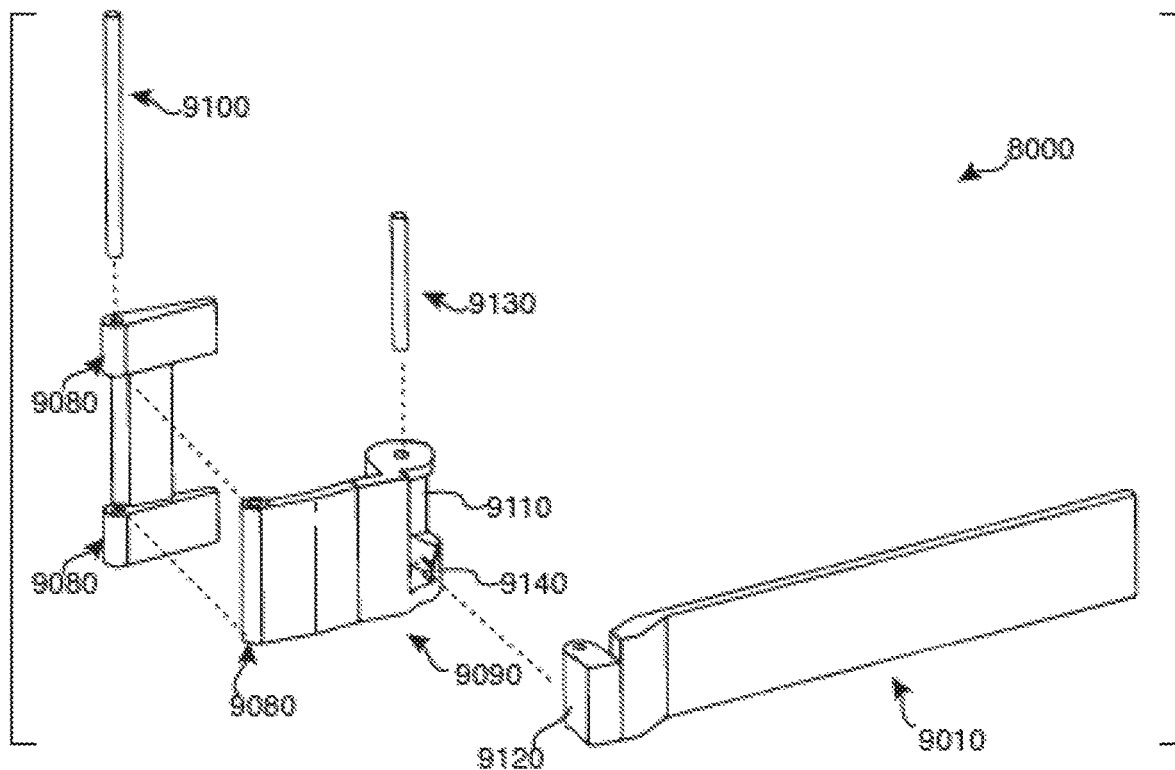
FIG. 9D is an exploded view of a hinge in accordance with an exemplary embodiment of the present technology.

Referring to FIGS. 9C and 9D, certain embodiments of a hinged mount 8000 comprising a brace structure 9010 further comprises a first hinge pivot axis 9050 and a second hinge pivot axis 9060. In such embodiments, a static mount plate 9070 having is attached to an exterior planar surface 4010 of a vehicle 2000, typically proximate to a vertical trailing edge 2030. The static mount plate 9070 has a plurality of hinge knuckles 9080. An intermediate hinge component 9090 having at least one hinge knuckle 9080 at first distal end mates with said static mount plates 9070 having first and second hinge knuckles 9080. The hinge knuckle 9080 of the intermediate hinge component 9090 is configured to interface between the hinge knuckles 9080 of the static mount plate 9070 aligning the hinge knuckles. This alignment of hinge knuckles 9080 allows a first pin component 9100 to be disposed through the aligned hinge knuckles 9080 to provide axial constraint between the static mount plate 9070 and the intermediate hinge component 9090 along the first hinge pivot axis 9060. The intermediate hinge component 9090 has a receiving feature 9110 at a second distal end configured to receive a mating feature at a first distal end of the brace structure 9010. In such embodiments the mating feature of the brace structure 9010 comprises a brace structure knuckle 9120. The brace structure knuckle 9120 and receiving feature 9110 each have a through-hole of equal diameter configured to align with the second hinge pivot axis 9060. The alignment of the through-holes along the second hinge pivot axis 9060 allows the insertion of a second pin component 9130 to provide axial constraint between the intermediate hinge component 9090 and the brace structure 9010.

Certain embodiments of the referring again to FIG. 9D, the receiving feature 9110 of the intermediate hinge component 9090 further comprises a mechanical stop 9140. The presence of the mechanical stop 9130 prevents axial rotation inward toward the vehicle 2000. However, the lifting of the brace structure 9010 allows the bypassing of the mechanical stop 9140. In embodiments where the brace structure 9010 is affixed to an aerodynamic device for the attachment to a vehicle, this allows a user to store the aerodynamic device against the aft-plane of the vehicle 2000.

Figure 10:
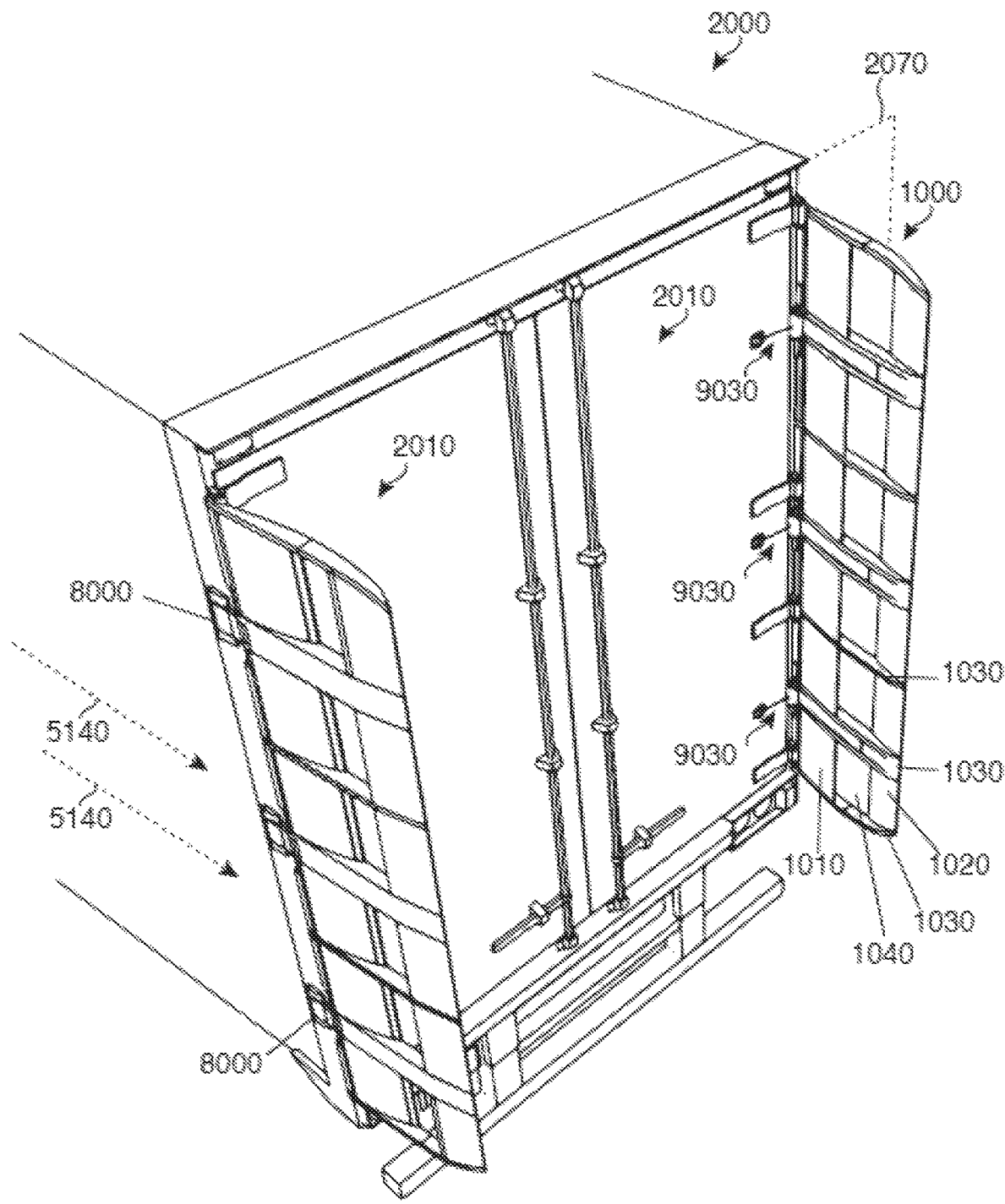
FIG. 10 is a perspective view of a planar form attached to a vehicle in accordance with an exemplary embodiment of the present technology.

In certain embodiments of the present disclosure, as shown in FIG. 10, comprise a system for the aerodynamic improvement of a vehicle such as a semi-trailer. Such embodiments comprise a plurality of aerodynamic devices 1000, each attached to the vehicle 2000 in proximity to the aft-plane of the vehicle. The aerodynamic devices 1000 are configured to interact with airflow 5140 surrounding the vehicle associated with the forward travel of the vehicle. The aerodynamic devices further comprise an airfoil 1010, a stabilizer 1020, a plurality of stiffeners 1030 and a plurality of apertures 1040. Certain embodiments of the present disclosure dispose the aerodynamic devices 1000 parallel with the general direction of airflow 5140 along the vehicle 2000 while alternate embodiments dispose the aerodynamic devices 1000 at a device offset angle 4020 from the direction of airflow 5140. In certain alternative embodiments, the aerodynamic devices 1000 are disposed at a device offset angle 4020 of 7-degrees inward toward the vehicle 2000. The plurality of aerodynamic devices 1000 affixed to the vehicle 2000 using a hinged mechanism 8000 allows the rotative repositioning of the aerodynamic devices 1000 in relation to the vehicle 2000 to prevent interference with such operations as the opening of a door 2010. The system further comprises a plurality of tensile components 9030 affixed between each aerodynamic device 1000 and to maintain an angular separation from the aft-plane 2070 of the vehicle 2000 when the doors 2010.

It will be appreciated to those skilled in the art that the fixation of the apparatus or system as disclosed herein need not be affixed in a hinged manner and one or more aerodynamic devices 1000 may be statically affixed to the vehicle.

Figure 11:
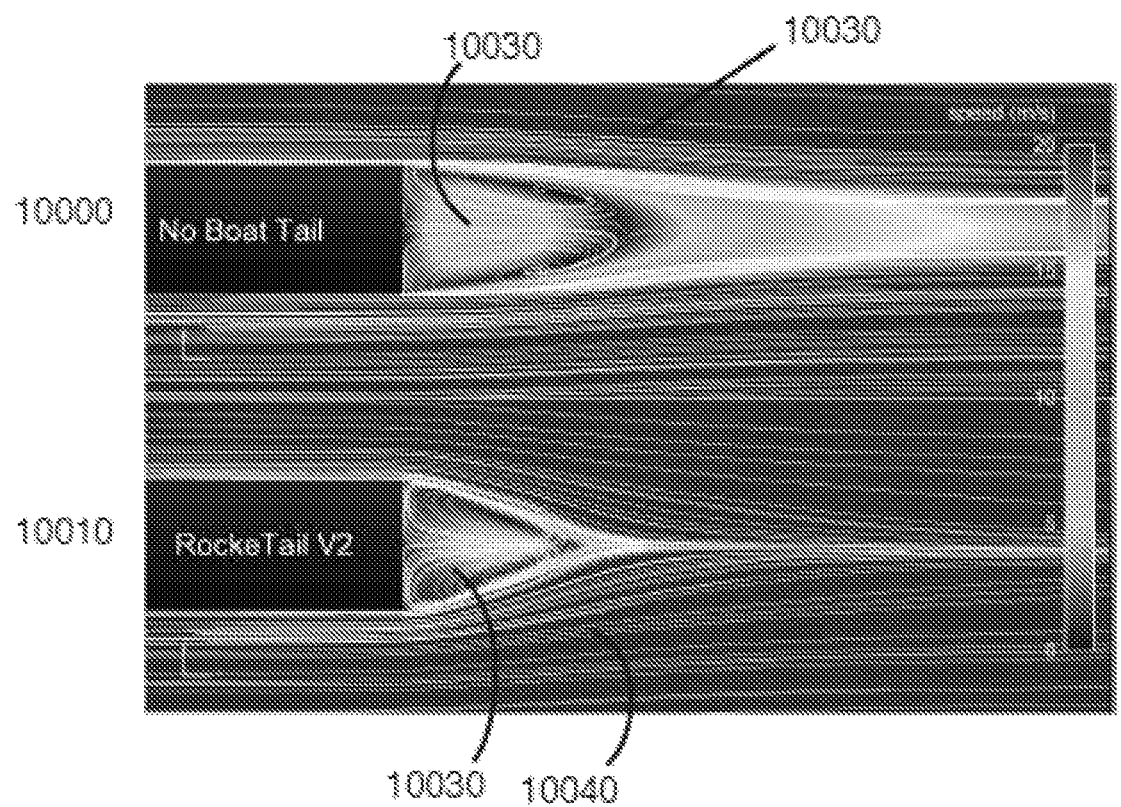
FIG. 11 shows simulation results comparing an embodiment of the present disclosure to a reference vehicle without aerodynamic improvements.

As shown in FIG. 11, comparative simulations were conducted in accordance with SAE J1252 testing protocol. The comparative test surrounded two vehicles: A baseline truck 10000 and a test truck 10010. The baseline truck 10000 is equipped with a standard tractor and 53 ft trailer with no aerodynamic improvements. The test truck 10010 is equipped with a standard semi-truck and 53-foot semi-trailer with a certain embodiment of the aerodynamic device as discussed herein. The tapering of flow dynamics as shown behind the test truck 10010 demonstrates more efficient conversion from turbulent flow 10030 to a laminar flow 10040 pattern trailing the semi-trailer than that of the reference truck 10000. The more efficient conversion to laminar flow 10040 translates into lower pressure differentials and mitigated turbulent flow characteristics, which are factors associated with improving aerodynamic efficiency.

Figure 12A:
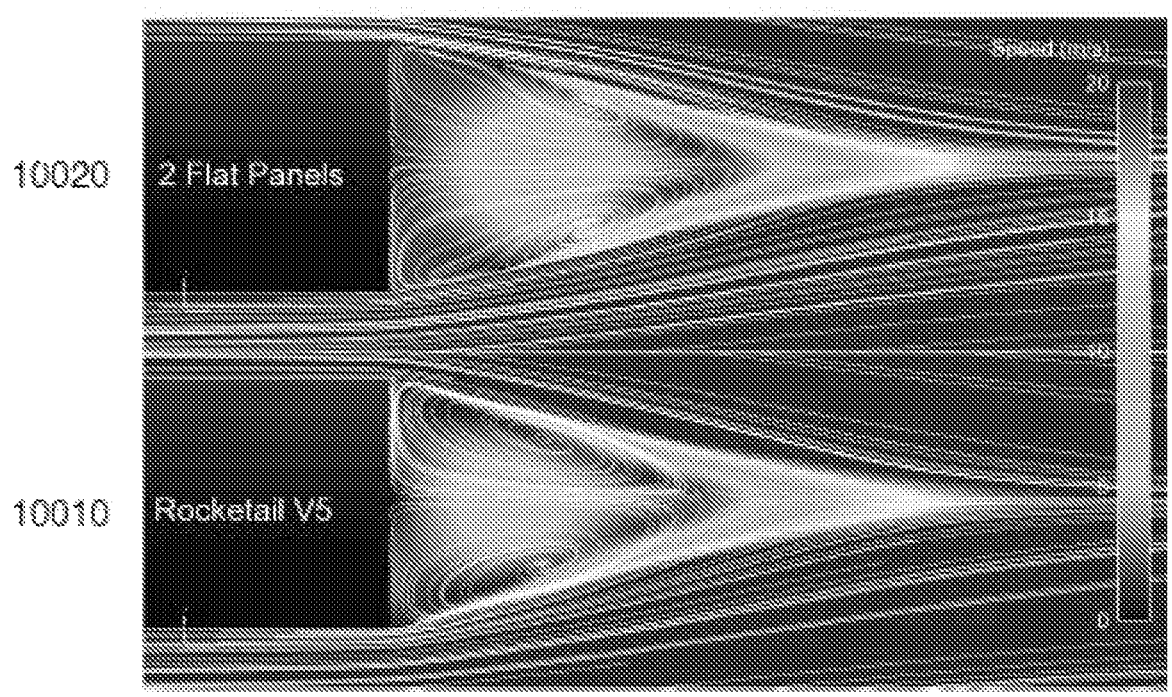
FIG. 12A shows simulation results comparing an embodiment of the present disclosure to a reference vehicle with over-sized flat panels.
Figure 12B:
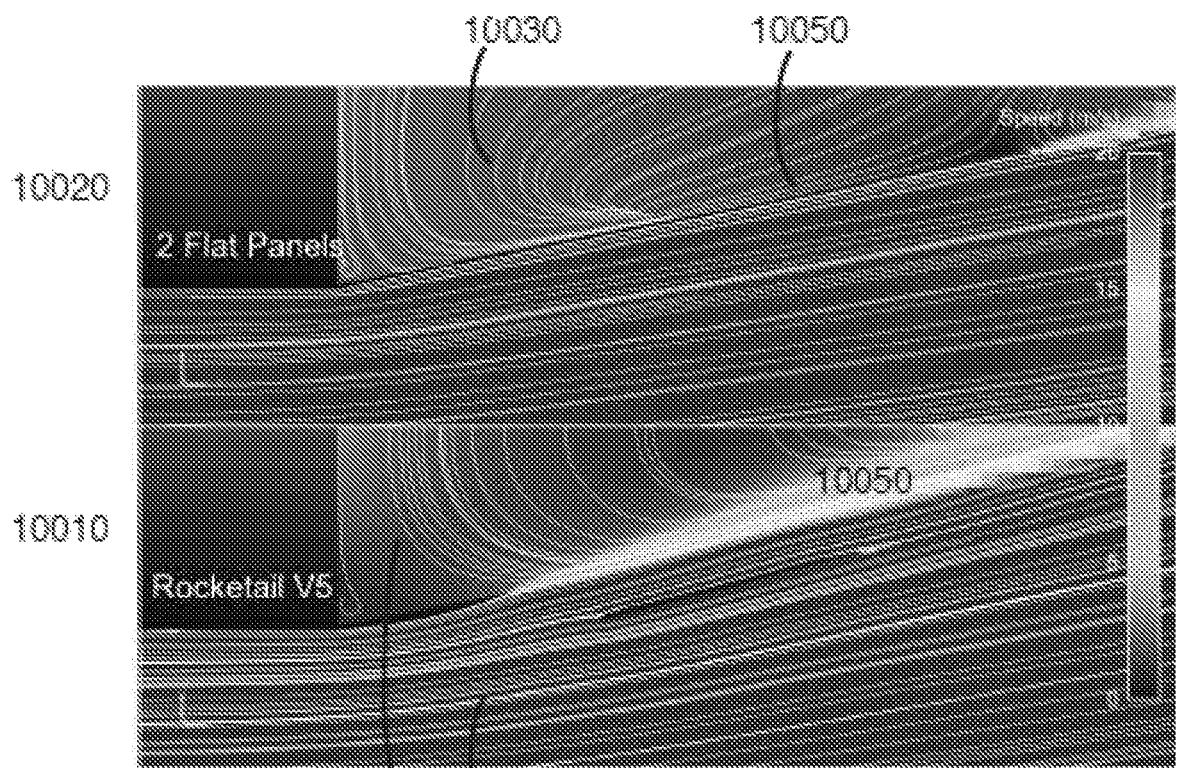
FIG. 12B is a close-up view of simulation results shown in FIG. 12A.

As shown in FIG. 12A, comparative simulations were conducted in accordance with SAE J1252 testing protocol. The comparative test surrounded two vehicles: A reference truck 10020 and a test truck 10010. The reference truck 10020 is equipped with a standard tractor and 53-foot trailer with aerodynamic improvements comprising two flat panels mounted at the vertical trailing edges of the reference truck 10020 extending rearward 4 feet and having an optimal angle of attack of I I-degrees inward toward the semi-trailer (Salari, Kambiz DOE's Effort to Improve Heavy Vehicle Aerodynamics through Joint Experiments and Computations. Lawrence Livermore Laboratory, 2013. LLNL-PRES-629672). The test truck 10010 is equipped with a standard semi-truck and 53 foot semi-trailer with a certain embodiment of the aerodynamic device as discussed herein extending away from the semi-trailer rearward 27 inches and having an angle of attack of 7-degrees inward toward the semi-trailer. As shown, the efficiency of conversion to laminar flow 10040 between the reference truck 10020 and the test truck 10010 are similar despite the aerodynamic device extending rearward less than half the distance than that of the flat panels of the reference truck 10020. As shown in FIG. 12B, upon closer inspection of boundary region 10050 between the laminar flow 10040 and the turbulent flow 10030, it is apparent that the flow dynamics show less turbulent flow 10030 in the case of the test truck 10010 due to pressure equalization provided by airflow redirection.

Figure 13A:
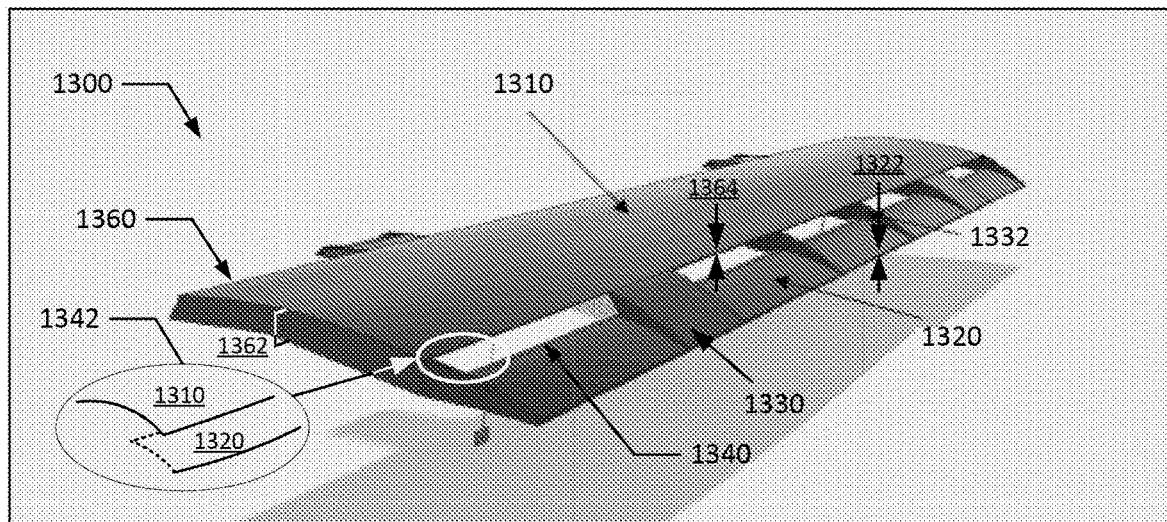
FIG. 13A is a front perspective view of an aerodynamic device in accordance with an exemplary embodiment of the present technology.

FIG. 13A is a front perspective view of an aerodynamic device 1300 in accordance with another embodiment of the present disclosure. In the illustrated embodiment of FIG. 13A, the aerodynamic device 1300 includes a primary airfoil 1310 and a secondary airfoil 1320 (which acts as a stabilizer) interconnected by a series of stiffeners 1330 and struts 1332 spanning between them. In one embodiment, the secondary airfoil 1320 is configured to reduce the airflow separation from the primary airfoil 1310.

Figure 13B:
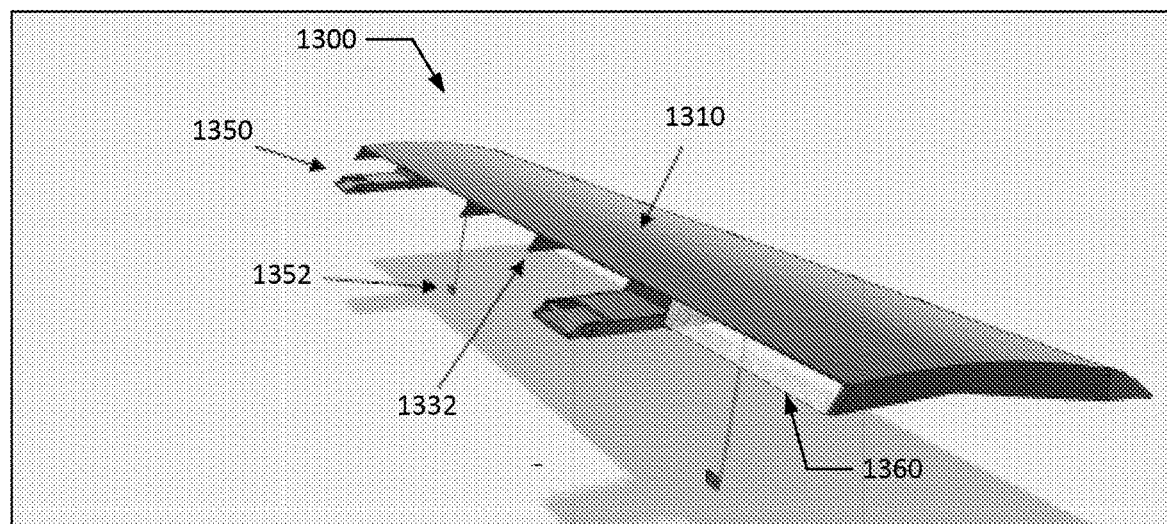
FIG. 13B is a rear perspective view of the aerodynamic device in accordance with an exemplary embodiment of the present technology.

FIG. 13B is a rear perspective view of the aerodynamic device 1300 in accordance with another embodiment of the present disclosure. The rear perspective view of the aerodynamic device 1300 shown in the illustrated embodiment of FIG. 13B further includes: a hinge 1350 configured to mount to the side of the trailer; and a locking rod 1352 configured to attach to the trailer door for auto deploying and/or retracting of the aerodynamic device 1300. The view of FIG. 13B also shows the rear view of the struts 1332.

In the illustrated embodiments of FIGS. 13A and 13B, certain embodiments may use a primary airfoil 1310 having a thin-form in concert with a stabilizer 1320 to modify airflow direction. For example, the primary airfoil 1310, such as in the form of a sheet with a curved profile, provides an outboard surface and an inboard surface with substantially similar arc lengths as opposed to the form of a wing-form airfoil having an outboard (upper) surface and inboard (lower) surface with differing arc lengths. The use of an airfoil having a thin-form as described provides, in certain embodiments, a lighter apparatus for the improvement of aerodynamics of a vehicle. A thin-form air-foil in certain embodiments also provides the benefit of a smaller cross-sectional area presented to the general airflow providing lower aerodynamic drag forces known as form-drag. Form drag is understood by those skilled in the art to depend upon a cross-sectional profile of a form wherein the cross-section is orthogonal to the general airflow. Such an airfoil may be desired to provide a concave and a convex side of an airfoil, configured to interact with the general airflow. In the illustrated embodiments of FIGS. 13A and 13B, certain embodiments provide airflow inlets 1360 and airflow outlets 1340 for the ducting of the general airflow over inboard and outboard surfaces of an airfoil, a stabilizer, and other features that may be used with such an apparatus in the improvement of aerodynamics of a vehicle. Such ducting allows for preparation of the general airflow surrounding a vehicle prior to the interaction with certain elements such as an airfoil or stabilizer. Furthermore, such ducting allows for directing a desired portion of the general airflow to interact with inboard and outboard surfaces associated with an airfoil or stabilizer.

In the illustrated embodiments of FIGS. 13A and 13B, the preparation of the general airflow prior to interactions with an airfoil or stabilizer provides a cleaner general airflow. It will be appreciated that inefficient flow dynamics turbulence caused by eddies and vortices may exist along external surfaces of a vehicle. Such turbulence may be caused by surroundings such as separation between portions of a vehicle (such as between a semi-truck and a trailer), or cross-winds. The preparation of the airflow, such as through ducting, decreases inefficient flow dynamics from the general airflow. The interaction of turbulence negatively impacts the operation of an apparatus for the improvement of aerodynamics. In certain scenarios, turbulence may cause oscillation of, and potentially damage such an apparatus. The decrease of inefficient flow-dynamics through ducting allows higher efficiency operation of an apparatus as described.

Referring to FIG. 13A, inset 1342 shows the detailed design of the primary airfoil 1310 and the second airfoil 1320 (i.e., the stabilizer). According to FIG. 13A, certain embodiments of an apparatus for the improvement of aerodynamics of a vehicle comprise an airfoil 1310 offset from an exterior surface of a vehicle and a stabilizer 1320 wherein the airfoil 1310 overlaps the stabilizer 1320. Such an overlap provides a configuration wherein the apparatus has an airflow inlet 1360 and an airflow outlet 1340. A portion of the general airflow from the exterior surface of the vehicle is directed into the airflow inlet 1360 of the apparatus and along the inboard surface of the airfoil 1310. A portion of the general airflow flowing along the inboard surface of the airfoil 1310 is directed through the airflow outlet 1340 for subsequent interaction with the stabilizer 1320. Furthermore, a portion of the general airflow flowing along the outboard surface of the airfoil 1310 is directed through the airflow outlet 1340 for subsequent interaction with the stabilizer 1320.

Figure 13C:
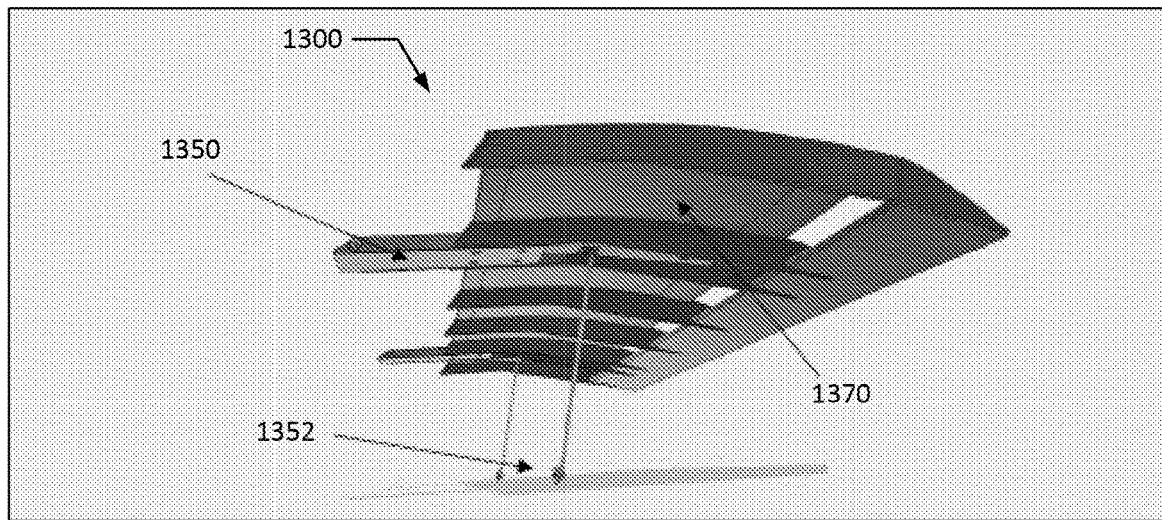
FIG. 13C is bottom perspective view of the aerodynamic device in accordance with an exemplary embodiment of the present technology.

FIG. 13C is a bottom perspective view of the aerodynamic device 1300 in accordance with another embodiment of the present disclosure. The bottom perspective view of the aerodynamic device 1300 shown in the illustrated embodiment of FIG. 13C further includes an air channel 1370 which allows the air to flow under the primary airfoil 1310 and over the second airfoil 1320. The view of FIG. 13C also shows the bottom view of the hinge 1350 and the locking rod 1352.

In summary, the illustrated embodiments of FIG. 13A to FIG. 13C show an apparatus for improving aerodynamics of a vehicle. The apparatus includes a plurality of stiffeners 1330, 1332, the first airfoil 1310, a second airfoil 1320, an airflow inlet 1360, and an airflow outlet 1340. The plurality of stiffeners 1330, 1332 are offset from each other. The first airfoil 1310 is configured as a thin-form sheet. The second airfoil 1320 is coupled to the first airfoil 1310 using the plurality of stiffeners 1330, 1332, wherein a trailing edge of the first airfoil 1310 overlaps a leading edge of the second airfoil 1320 (see inset 1342 of FIG. 13A). The airflow inlet 1360 is defined by a leading edge of the first airfoil 1310 and a pair of stiffeners of the plurality of stiffeners 1330, 1332. The airflow outlet 1340 is defined by the trailing edge of the first airfoil 1310, the leading edge of the second airfoil 1320, and the pair of stiffeners. The thin-form sheet of the first airfoil 1310 is configured in a curved shape with pre-defined radius of curvature 1362 and thickness 1364. Since the thickness 1364 is very small, it can be stated that the curve shape has substantially similar arc lengths for an outboard surface and an inboard surface of the first airfoil 1310. The apparatus further includes a hinge unit 1350 coupled to the inboard surface of the first airfoil 1310 and configured to mount to an external surface of the vehicle. The apparatus further includes a locking rod 1352 configured to attach to a door of the vehicle for auto deploying and retracting of the apparatus.

Figure 14:
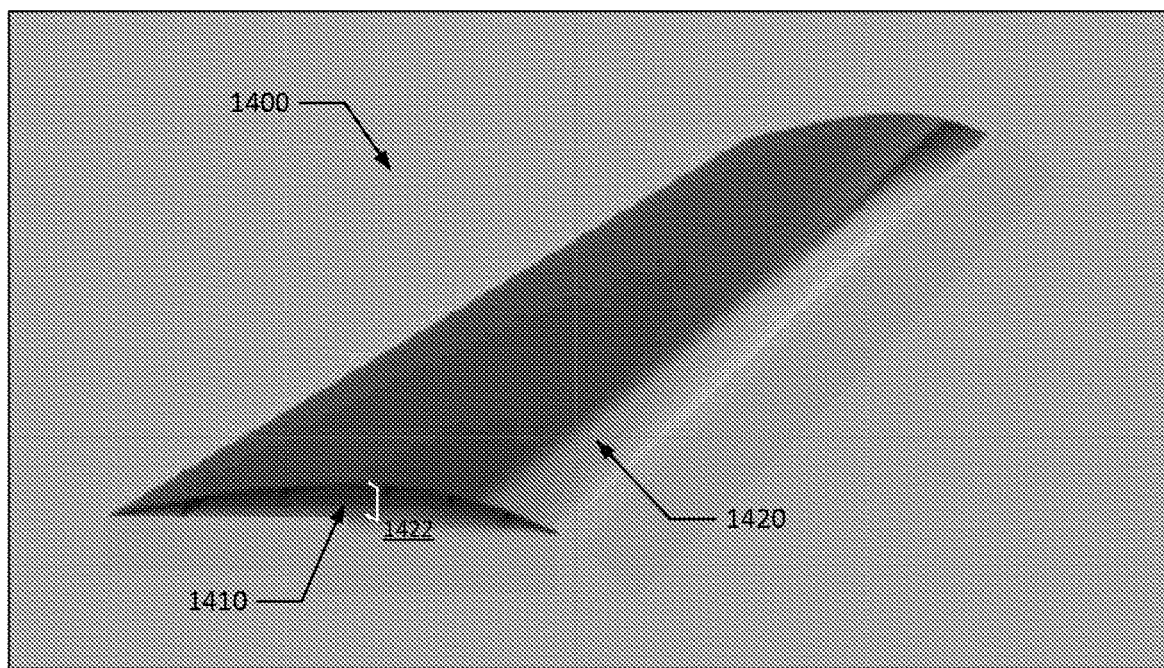
FIG. 14 is a front perspective view of a convex aerodynamic device in accordance with an exemplary embodiment of the present technology.

FIG. 14 is a front perspective view of a convex aerodynamic device 1400 in accordance with one embodiment of the present disclosure. In the illustrated embodiment of FIG. 14, the improved aerodynamic device 1400 is configured into a convex form 1410 which may be affixed to a top surface of the vehicle. Typically, such a convex form is mounted substantially perpendicular to the general airflow surrounding a vehicle wherein the convex aerodynamic device 1400 extends beyond the boundary region and into the general airflow region 1420. Such embodiments of a convex form 1410 serve to improve flow separation from airflow traveling in contact or close proximity to the top surface of a vehicle. The improvement of flow separation from the top of the vehicle serves to decrease drag caused by eddy formation, vortices or other inefficient flow dynamics.

Given the above description of the airflow and the designs of the airfoils and devices shown in FIGS. 13A through 14, the radius of curvatures and thicknesses of the airfoils and devices can vary as shown. For example, in one implementation shown in FIG. 13A, the radius of curvature 1362 of the primary foil 1360 is designed to be approximately 1 inch. Also, as shown in FIG. 13A, the thickness 1364 of the primary airfoil 1360 is designed to be approximately 0.20 to 0.25 inches thick, while the thickness 1322 of the secondary airfoil 1320 is designed to be approximately between ⅛ to ⅜ of an inch. Further, as shown in FIG. 14, the radius of curvature 1422 of the aerodynamic device 1400 is designed to be approximately between 1 and 1.75 inches.

Figure 15:
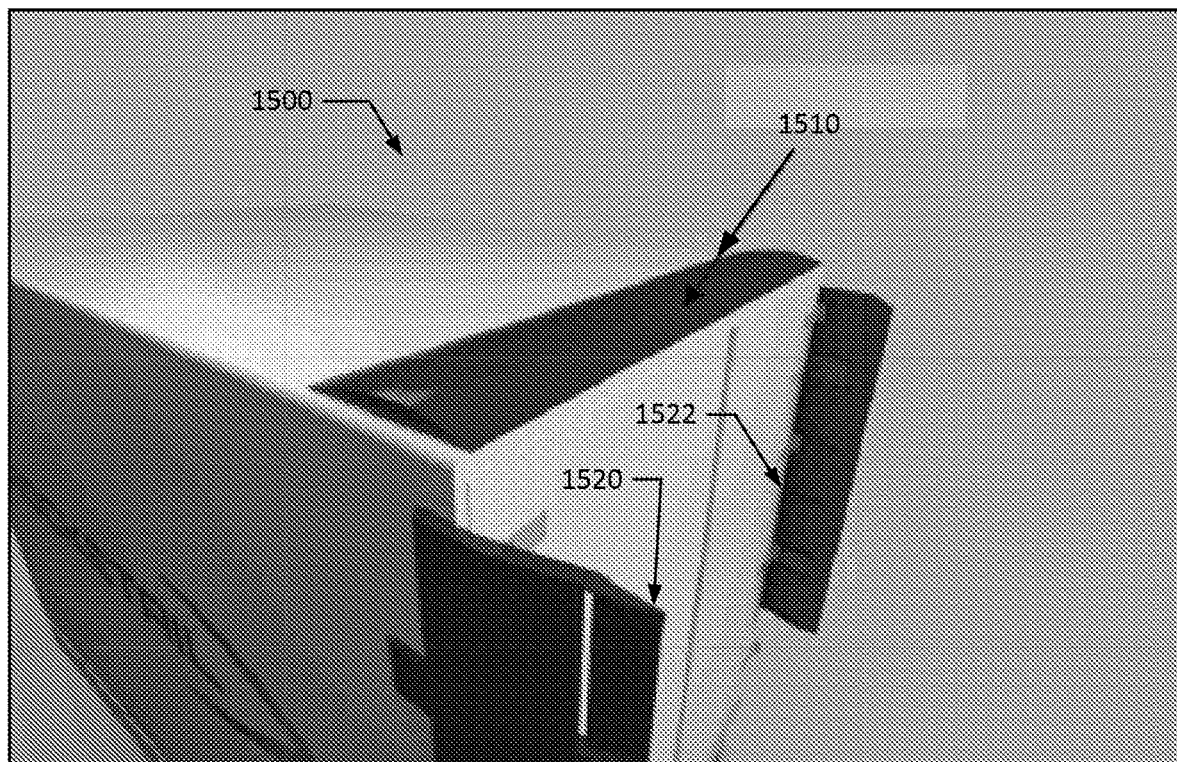
FIG. 15 is a rear perspective view of a vehicle including a top element coupled to the top of the vehicle and aerodynamic devices coupled to the sides of the vehicle in accordance with an exemplary embodiment of the present technology.

FIG. 15 is a rear perspective view of a vehicle 1500, such as a trailer, including a top element 1510 and aerodynamic devices 1520, 1522 coupled to the sides of the vehicle in accordance with one embodiment of the present disclosure. In the illustrated embodiment of FIG. 15, the top element 1510 is configured similarly to the convex aerodynamic device 1400 shown in FIG. 14 and each of the aerodynamic devices 1520, 1522 is configured similarly to the aerodynamic device 1300 shown in FIGS. 13A to 13C.

In summary, the illustrated embodiments of FIG. 13A to FIG. 15 show a system for improving aerodynamics of a vehicle. The system 1500 includes first 1520, second 1522, and third 1510 aerodynamic units. Each unit of the first and second aerodynamic units 1520, 1522 includes a first airfoil 1310 configured as a thin-form sheet and a second airfoil 1320 interconnected to the first airfoil 1310 using a plurality of stiffeners 1330, 1332. A trailing edge of the first airfoil 1310 overlaps a leading edge of the second airfoil 1320 as shown in inset 1342. As shown in FIG. 15, the first and second aerodynamic units 1520, 1522 are configured to mount to side surfaces of the vehicle. The third aerodynamic unit 1510 is shaped in a convex form and configured to mount to a top surface of the vehicle.

Figure 16:
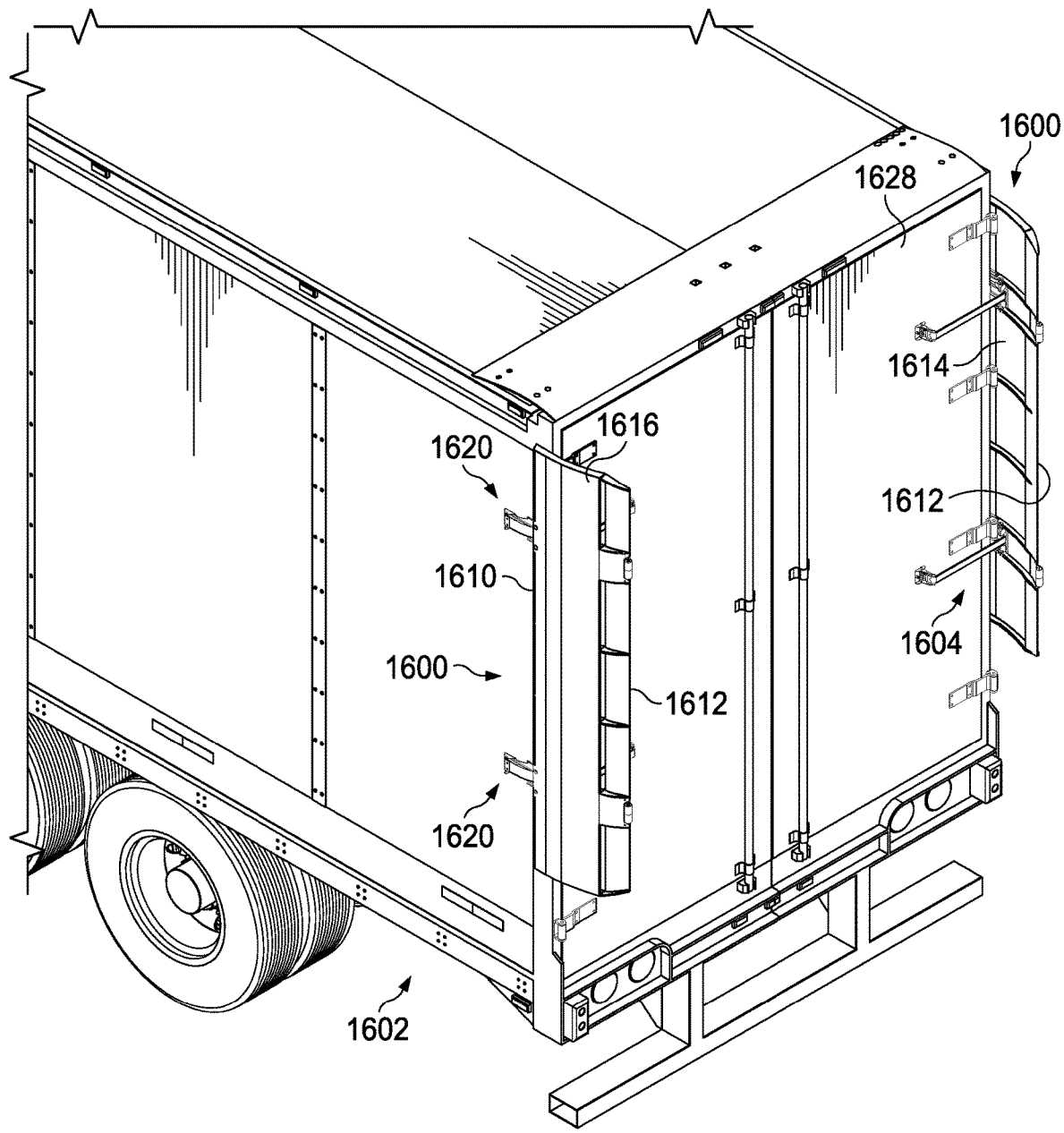
FIG. 16 is a perspective view of an aerodynamic device attached to a trailer in accordance with an exemplary embodiment of the present technology.
Figure 17:
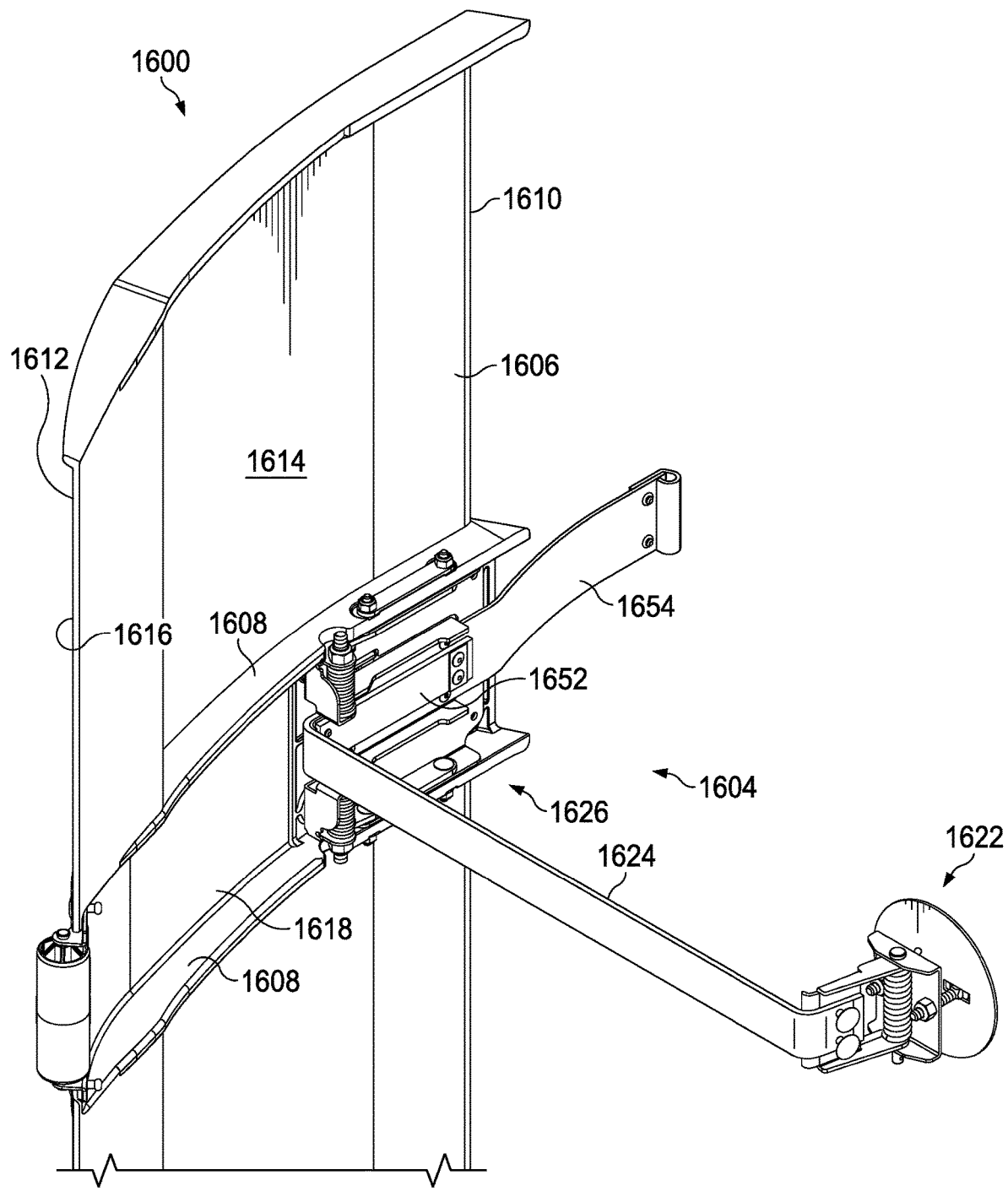
FIG. 17 is partial perspective view of the aerodynamic device in an operating position in accordance with an exemplary embodiment of the present technology.

Referring now to FIGS. 16 and 17 show an aerodynamic device 1600 in accordance with various embodiments of the present disclosure. The aerodynamic device 1600 may be coupled to a trailer 1602 by a flexible mounting system 1604. The aerodynamic device 1600 may include an airfoil 1606 interconnected by a series of stiffeners 1608.

The aerodynamic device 1600 and the flexible mounting system 1604 serve to limit the damage to the aerodynamic device 1600 when it is impacted from an external force during operation. Specifically, the flexible nature of the components of aerodynamic device 1600 and the flexible mounting system 1604 allow for external forces to impact the aerodynamic device 1600 without causing the system to fail.

The aerodynamic device 1600 may be constructed of any suitable material.

Each of the components may be constructed from industry-standard materials selected to comprise a structural rigidity sufficient to support the required air deflection function, while offering a level of mechanical flexibility sufficient to deflect resiliently under small to moderate impact loads, thereby reducing the need for frequent panel repair or replacement due to permanent impact damage. Materials suitable for use in the aerodynamic device 1600 may comprise, such as, for example, aluminum, molded polymer panels, polymer-based composite panels, fiber-reinforced polymer panels, and injection molded polycarbonate, acrylonitrile butadiene styrene ("ABS") plastic, polypropylene, polyethylene, and polystyrene, polyvinyl chloride ("PVC") or any suitable combination or mixture thereof. In one embodiment, the material for the aerodynamic device 1600 may comprise an injection molded mixture of polycarbonate and ABS plastic. One of ordinary skill in the art will appreciate that, under appropriate circumstances, considering such issues as cost, user preference, etc., other material selections for the aerodynamic device 1600 may be used. It should be understood to be highly beneficial for the aerodynamic device 1600 to comprise light and more flexible materials, without exhibiting unstable behavior.

The airfoil 1606 of the aerodynamic device 1600 may comprise a leading edge 1610, a trailing edge 1612, an inner surface 1614, and an outer surface 1616, similar to the other aerodynamic devices discussed above. As shown in FIG. 17, the stiffeners 1608 may be oriented on the inner surface 1614 from the leading edge 1610 to the trailing edge 1612 to comprise a mounting channel 1618.

The flexible mounting system 1604 may comprise a trailer hinge 1620 configured to mount to the side of the trailer 1602. The flexible mounting system 1604 may comprise a door hinge 1622, a door strap 1624, and a mounting bracket 1626. A first end of the door strap 1624 may be coupled to the door hinge 1622 while a second end of the door strap 1624 may be coupled to the mounting bracket 1626. In various embodiments, the door strap 1624 may comprise a semi rigid material. In one embodiment, the door strap 1624 may comprise an aircraft cable.

Figure 18:
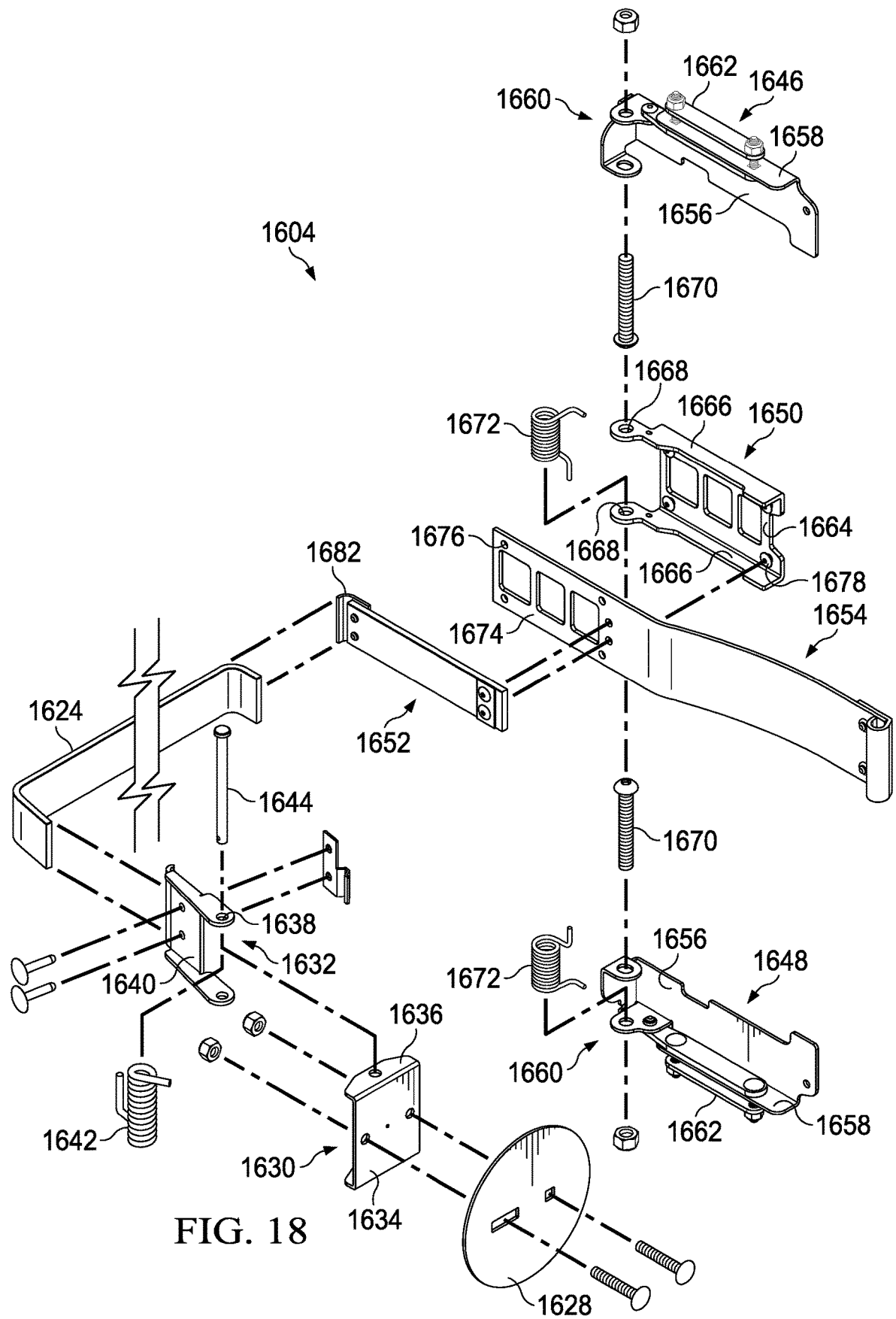
FIG. 18 is an exploded perspective view of a hinge mounting system accordance with an exemplary embodiment of the present technology.
Figure 20:
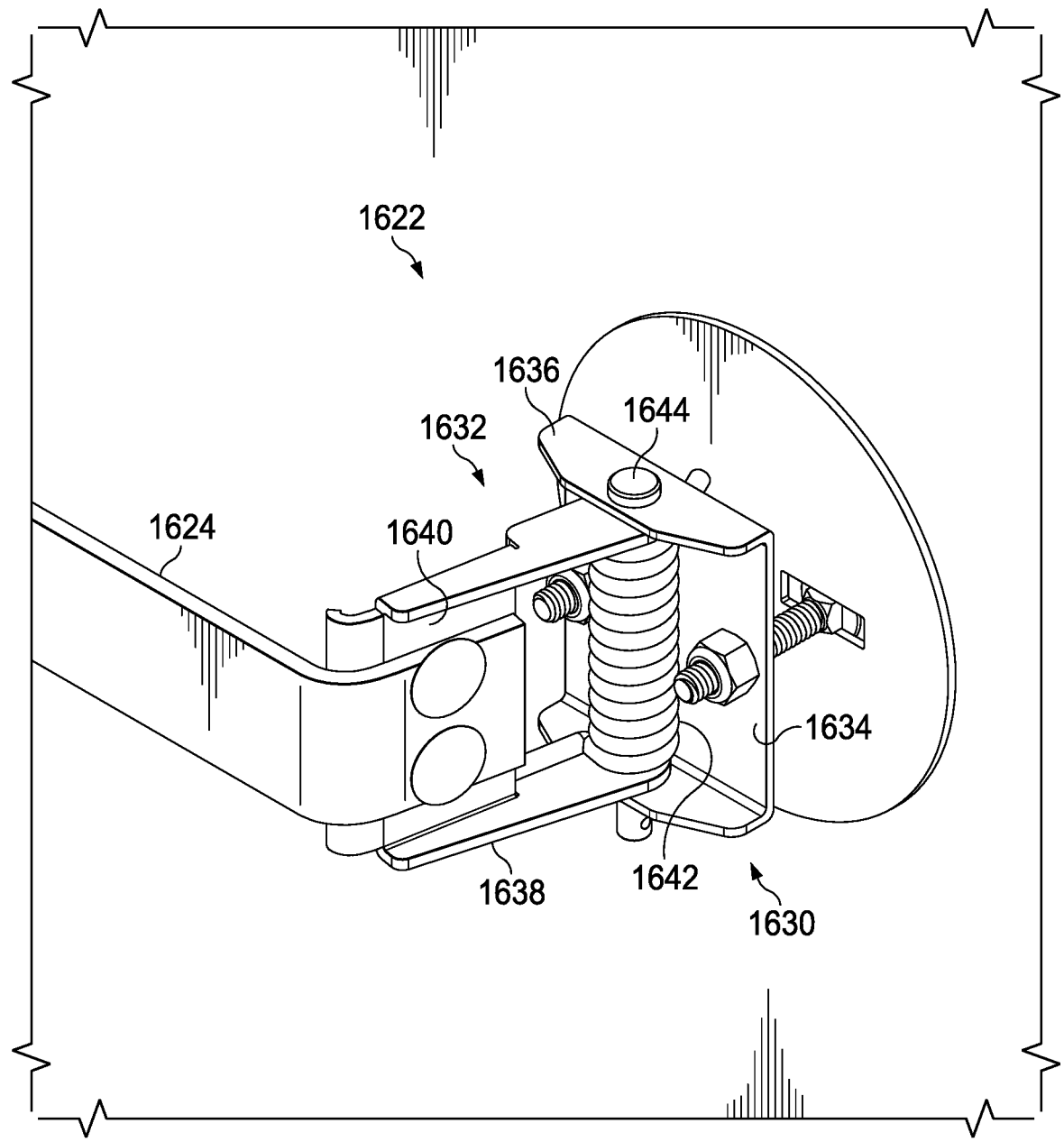
FIG. 20 is a perspective view of a door hinge/system accordance with an exemplary embodiment of the present technology.

Referring now to FIGS. 18 and 20, in various embodiments, the door hinge 1622 may be coupled to each respective trailer door 1628. The door hinge 1622 may comprise a bracket 1630 and a lever arm 1632 coupled thereto. The bracket 1630 may comprise a plate 1634 with a pair of apertures configured to mount the door hinge 1622 to the door 1628 using a nut and bolt arrangement along with an oversized washer. The bracket 1630 may comprise a pair of flanges 1636 depending outwardly from the plate 1634, each flange 1636 comprising a aperture.

The lever arm 1632 may comprise a pair of spaced apart arms 1638, each having an aperture, with a plate 1640 located therebetween. The plate 1640 contains a pair of apertures configured to couple the door strap 1624 thereto by fasteners.

When assembled, a torsion element 1642 is placed between the pair of spaced apart arms 1638 and a pin 1644 is placed within the apertures on the arms 1638 of the lever arm 1632 and the apertures on the flanges 1636 on the bracket 1630. As such, during operation, the lever arm 1632 is configured to torsionally rotate about the pin 1644 with respect to the bracket 1630. The torsion element 1642 may be configured to resist torsional movement of the lever arm 1632 with respect to the bracket 1630.

Figure 19:
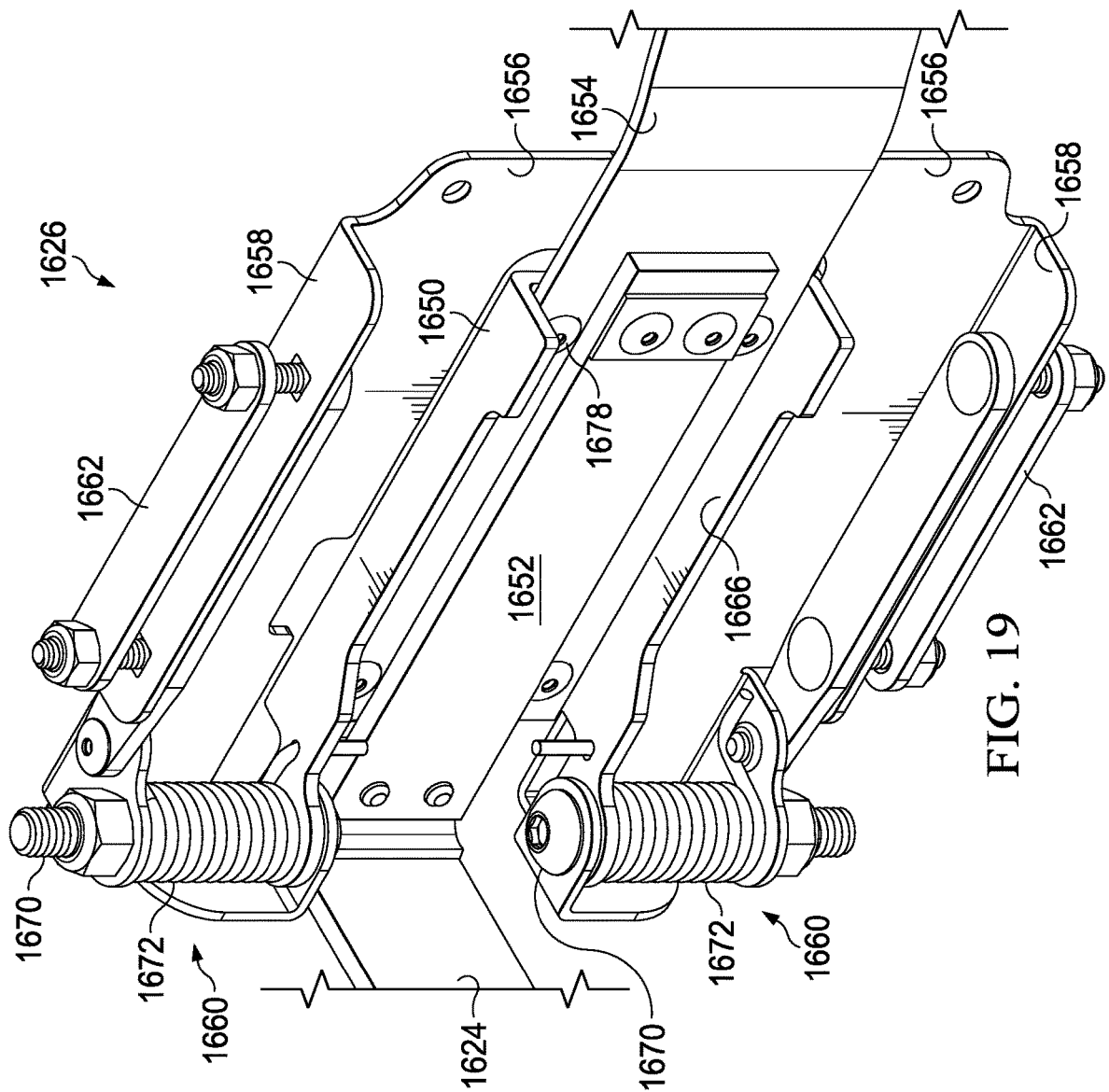
FIG. 19 is a perspective view of a mounting bracket/system accordance with an exemplary embodiment of the present technology.

Referring now to FIGS. 18 and 19, in various embodiments, the mounting bracket 1626 may comprise upper and lower rotary brackets 1646, 1648, a hinge plate 1650, a resilient spring 1652, and a hinge arm 1654. The upper and lower rotary brackets 1646, 1648 each comprise a plate 1656, a mounting flange 1658, and a hinge 1660. The mounting flanges 1658 depend from the plate 1656 and are configured to couple the mounting bracket 1626 to the airfoil 1606. The mounting flanges 1658 may comprise a pair of apertures that receive fasteners to couple the upper and lower rotary brackets 1646, 1648 to the stiffeners 1608 on the airfoil 1606. An elongated washer 1662 may also be utilized to facilitate attachment of the mounting flanges to the stiffeners.

In various embodiments, the hinge plate 1650 may comprise a central portion 1664 and a pair of depending flanges 1666 each having an aperture 1668 located proximate an end. The hinge plate 1650 may be coupled to each of the upper and lower rotary brackets 1646, 1648. When assembled, a fastener 1670 is placed within the aperture 1668 on each depending flange 1666 on the hinge plate 1650 and a pair of apertures located on the hinges 1660 to couple the hinge plate 1650 to the upper and lower rotary brackets 1646, 1648. A torsion spring 1672 is received on fastener 1670 and is configured to resist torsional rotation of the hinge plate 1650 with respect to the upper and lower rotary brackets 1646, 1648.

In various embodiments, the hinge arm 1654 may be coupled to the hinge plate 1650 at a first end and the trailer hinge 1620 mounted to the side of the trailer 1602 at a second end. The hinge arm 1654 may comprise a mounting portion 1674 at the first end having multiple apertures 1676 configured to couple mounting portion 1674 to the hinge plate 1650 utilizing fasteners 1678. As shown in FIG. 22D, the second end of the hinge arm 1654 may be coupled to the trailer hinge 1620 by a clip and fastener configuration 1680. In various embodiments, the hinge arm 1654 may comprise a rigid, a semi-rigid, and or and flexible material. In various embodiments, the hinge arm 1654 may comprise a spring steel material, which will allow the hinge arm 1654 to flex throughout the various positions described below in FIGS. 22A-22D.

In various embodiments, the resilient spring 1652 may be coupled to an end of the door strap 1624 at a first end and to the mounting portion 1674 of the hinge arm at a second end proximate the connection of the hinge arm 1654 to the hinge plate 1650. The first end of the resilient spring 1652 may be coupled to the door strap 1624 by a strap clip 1682 and the second end may be coupled to the mounting portion 1674 of the hinge arm 1654 by fasteners. In one embodiment the resilient spring 1652 may comprise a Gordon spring, manufactured by Gordon Holdings. As such, as shown in FIG. 22B, the first end of the resilient spring 1652 may flex or deflect away from the first end of the hinge arm 1654 attached to the hinge plate 1650 when in use.

The Gordon spring may comprise a composite flexible composite material, configured to flex or deflect in reaction to various external forces, as will be discussed in detail below. In various embodiments, the resilient spring 1652 may be constructed from an advanced composite material comprising vinyl Ester or epoxy resins and unidirectional fiber reinforcement technologies. Some combinations include glass/vinyl ester and/or glass/epoxy. In various embodiments, the resilient spring 1652 may comprise a composite spring. These formulations achieve long-lasting, consistent flexing performance in a variety of applications. Composite springs (also referred to as flat springs, flippers, energizers, slats, and exciters) are engineered with proprietary vinyl ester or epoxy resins and unidirectional glass or carbon fiber reinforcement technologies. These formulations achieve long-lasting, deep, and consistent flexing performance in a variety of cantilevered applications, from vibratory sorting and conveying systems to furniture. Still further, applications requiring high cyclic fatigue resistance, repeatability, and high performance are well served by composite springs. The types of materials for the fabric spring are similar to those made from PolyOne Corporation and/or Avient Corporation https://healthcare.polyone.com/products/advanced-composites/pultrusion-and-continuous-filament-winding-technology/advanced-composite-springs.

When assembled, the flexible mounting system 1604 is used to couple the aerodynamic device 1600 to the trailer 1602. Specifically, flexible mounting system 1604 is used to couple the aerodynamic device 1600 the door 1628 and a sidewall of the trailer 1602. In one embodiment, the flexible mounting system 1604 is coupled to the door 1628 of the trailer by the door hinge 1622. A first end of the door strap 1624 is coupled to the door hinge 1622 while a second end of the door strap 1624 is coupled to the first end of the resilient spring 1652 located on the mounting bracket 1626. The second end of the resilient spring 1652 is coupled to the mounting portion 1674 of the hinge arm 1654. The mounting portion 1674 of the hinge arm 1654 is coupled to the central portion 1664 of the hinge plate 1650. The second end of the hinge arm 1654 is coupled to the trailer hinge 1620 mounted to the side of the trailer 1602. The hinge plate 1650 is coupled to the hinges 1660 on the upper and lower rotary brackets 1646, 1648. The upper and lower rotary brackets 1646, 1648 are coupled to the stiffeners 1608 on the airfoil 1606 by the mounting flanges 1658.

Figure 21:
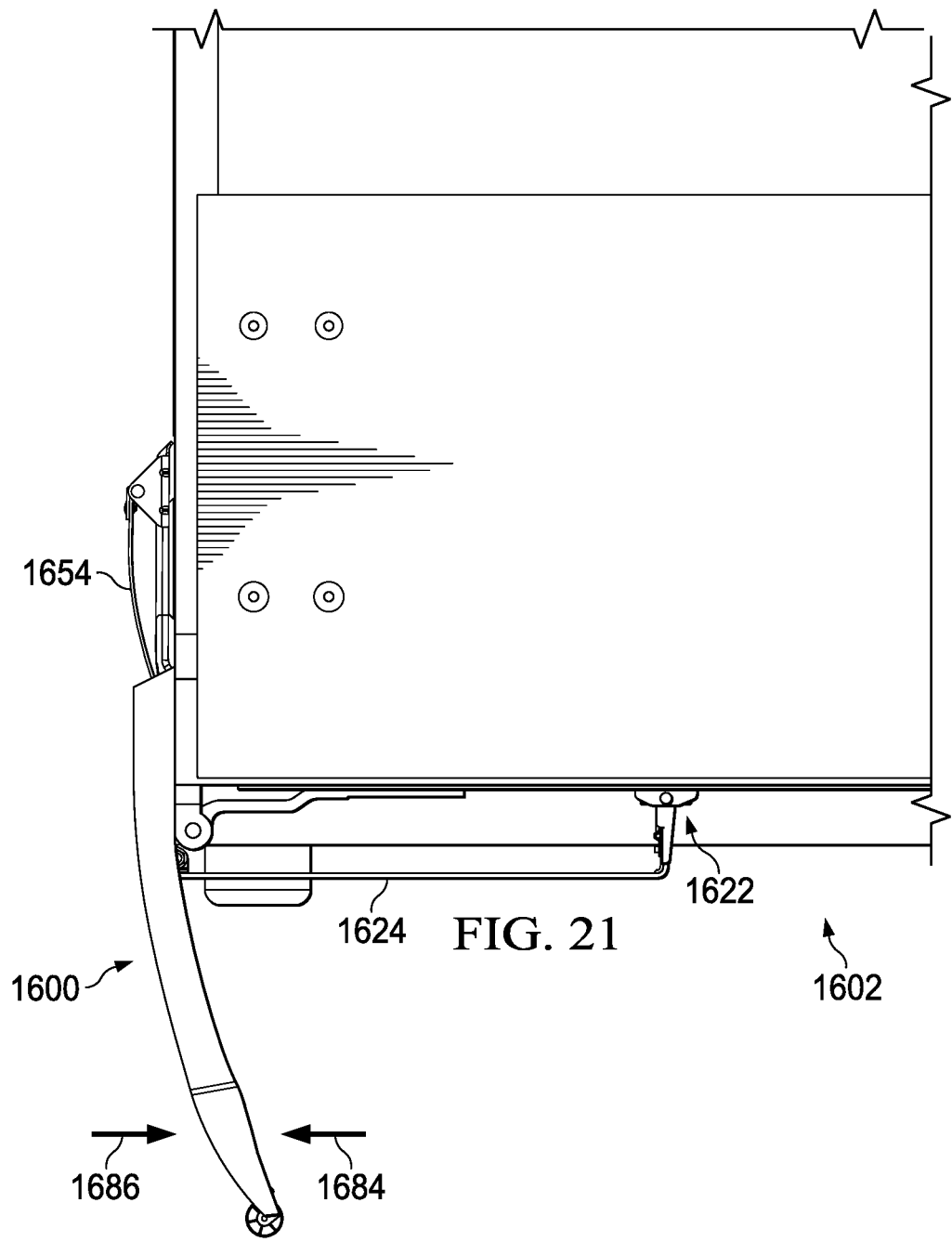
FIG. 21 is a top view of the aerodynamic device and flexible mounting system installed on a trailer in an operating position.
Figure 22A:
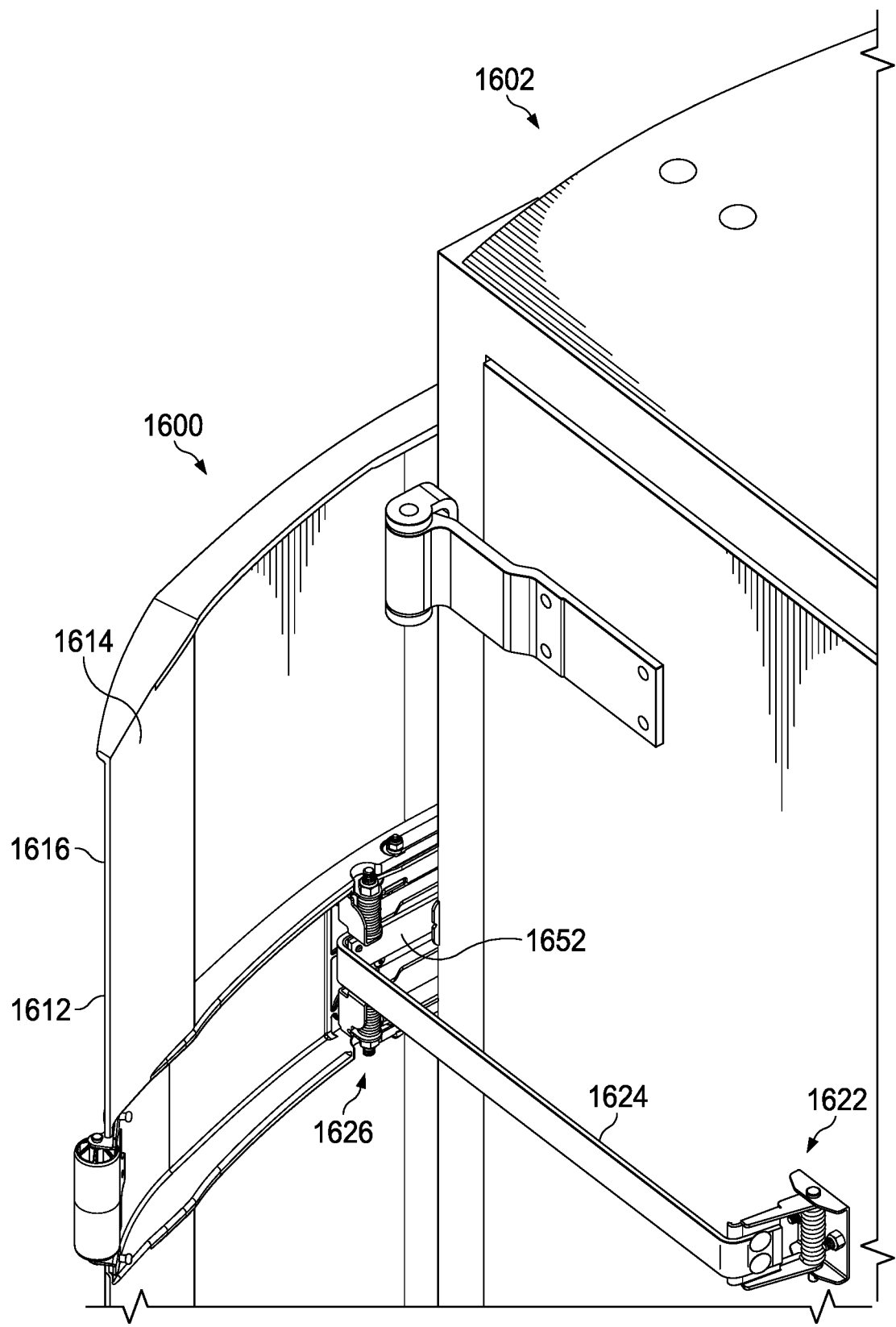
FIG. 22A is a partial rear perspective view of the aerodynamic device and flexible mounting system installed on a trailer in an operating position.
Figure 22B:
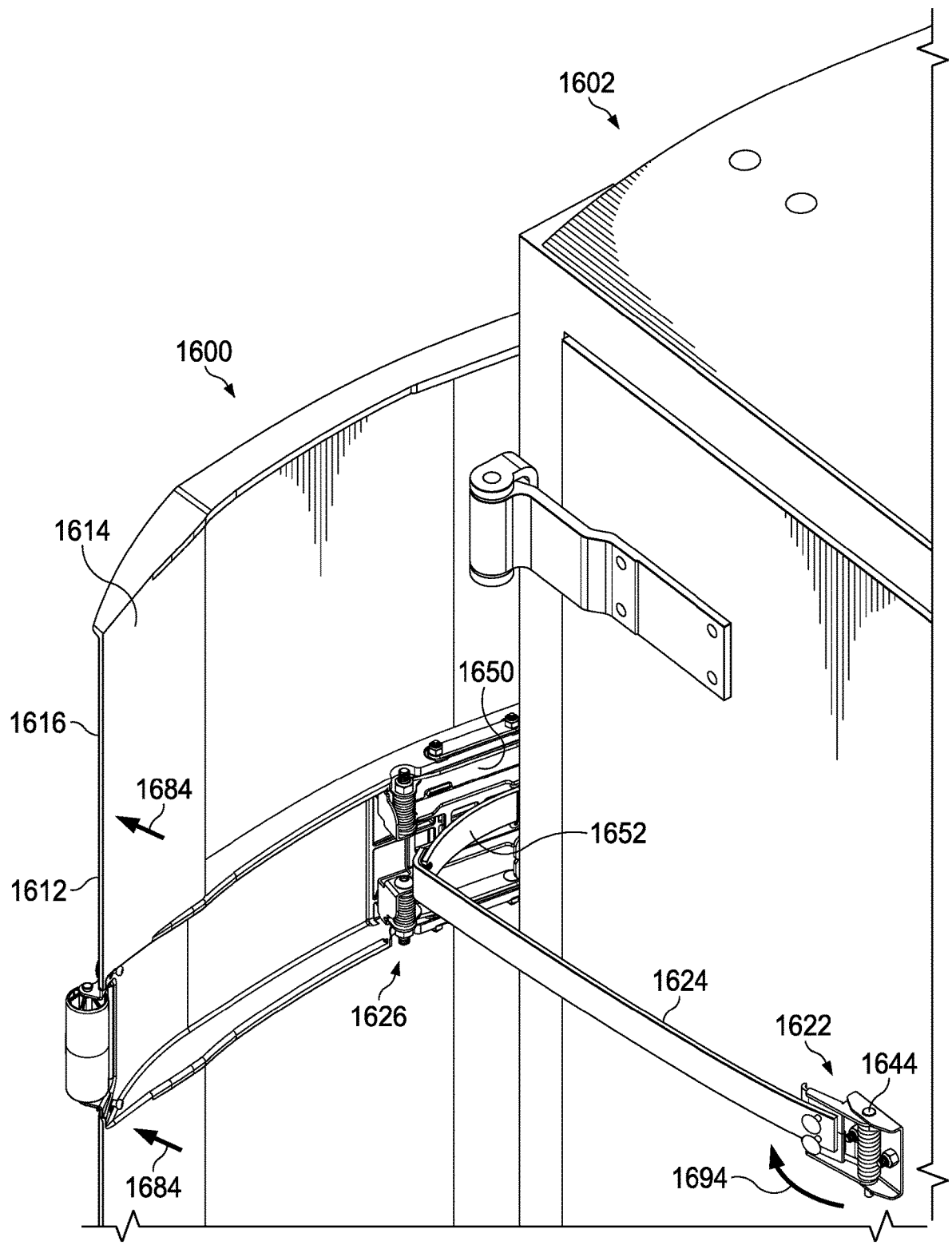
FIG. 22B is a partial rear perspective view of the aerodynamic device and flexible mounting system installed on a trailer in a hyperextended position.

FIGS. 21 and 22A shows the aerodynamic device 1600 and flexible mounting system 1604 installed on a trailer 1602 in an operating position. The operating position is the in-use position. In the operating position the resilient spring 1652 and the lever arm 1632 of the door hinge 1622 are in a first, non-deflected and/or minimal deflected position. In the operating position, the upper and lower rotary brackets 1646, 1648 and the hinge plate 1650 of the mounting bracket 1626 are substantially abutting and aligned.

FIG. 22B shows the aerodynamic device 1600 and flexible mounting system 1604 installed on a trailer 1602 in a hyperextended position. The hyperextended position occurs when an external force, shown by arrow 1684, (see FIGS. 19 and 22B) deflects the aerodynamic device 1600 outwardly, away from the centerline of the trailer 1602. The deflection of the aerodynamic device 1600 outwardly causes lever arm 1632 of the door hinge 1622 to rotate clockwise (see arrow 1694 in FIG. 22B) about the pin 1644 to a deflected position. Once the door hinge 1622 is rotated fully, the external force 1684 on the aerodynamic device 1600 will cause the door strap 1624 to deflect the resilient spring 1652, which will allow the aerodynamic device 1600 to move without causing the flexible mounting system 1604 to fail. In the hyperextended position, the upper and lower rotary brackets 1646, 1648 and the hinge plate 1650 of the mounting bracket 1626 are substantially abutting and aligned (see FIG. 19).

Figure 22C:
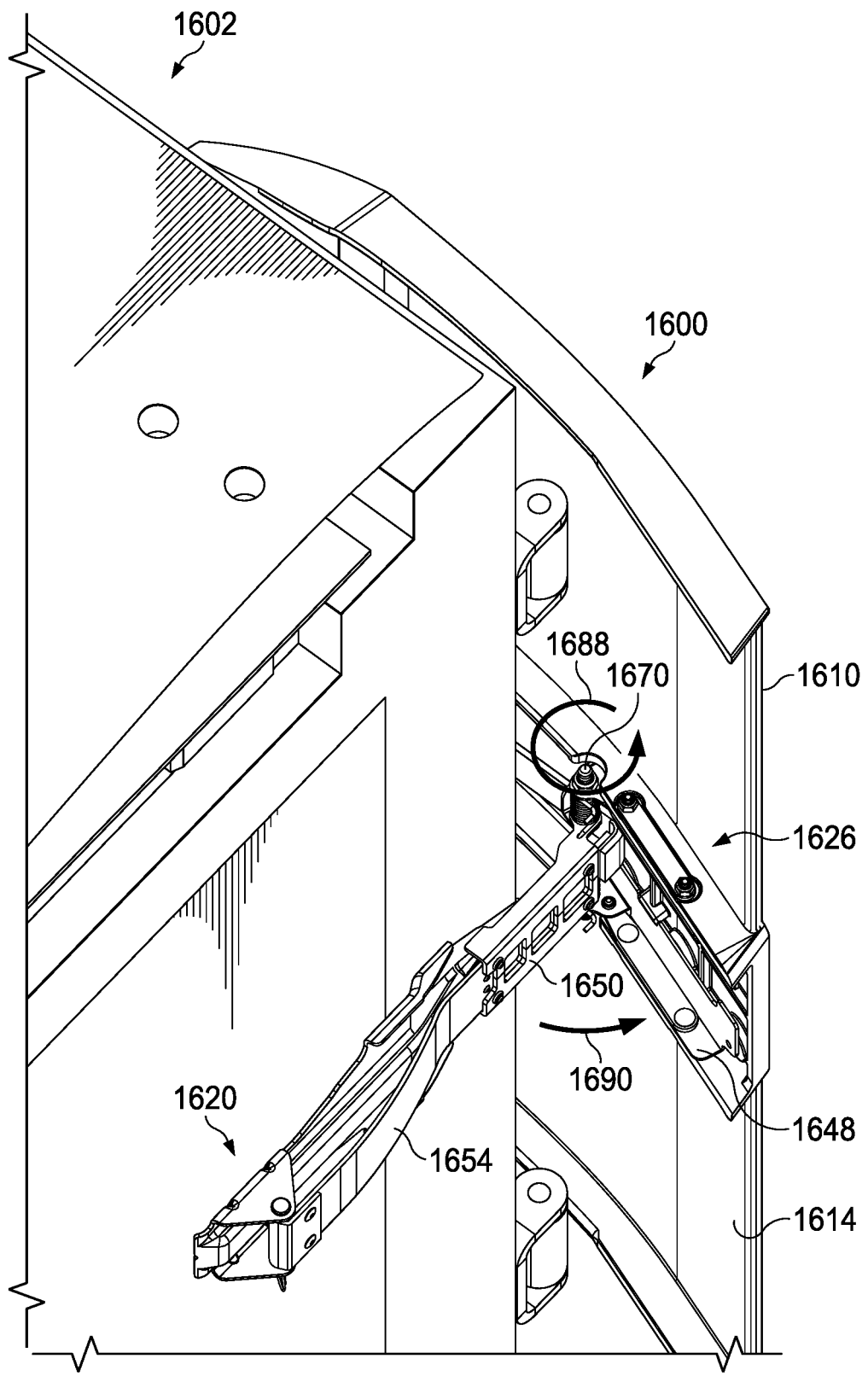
FIG. 22C is a partial rear perspective view of the aerodynamic device and flexible mounting system installed on a trailer in a retracted position.
Figure 22D:
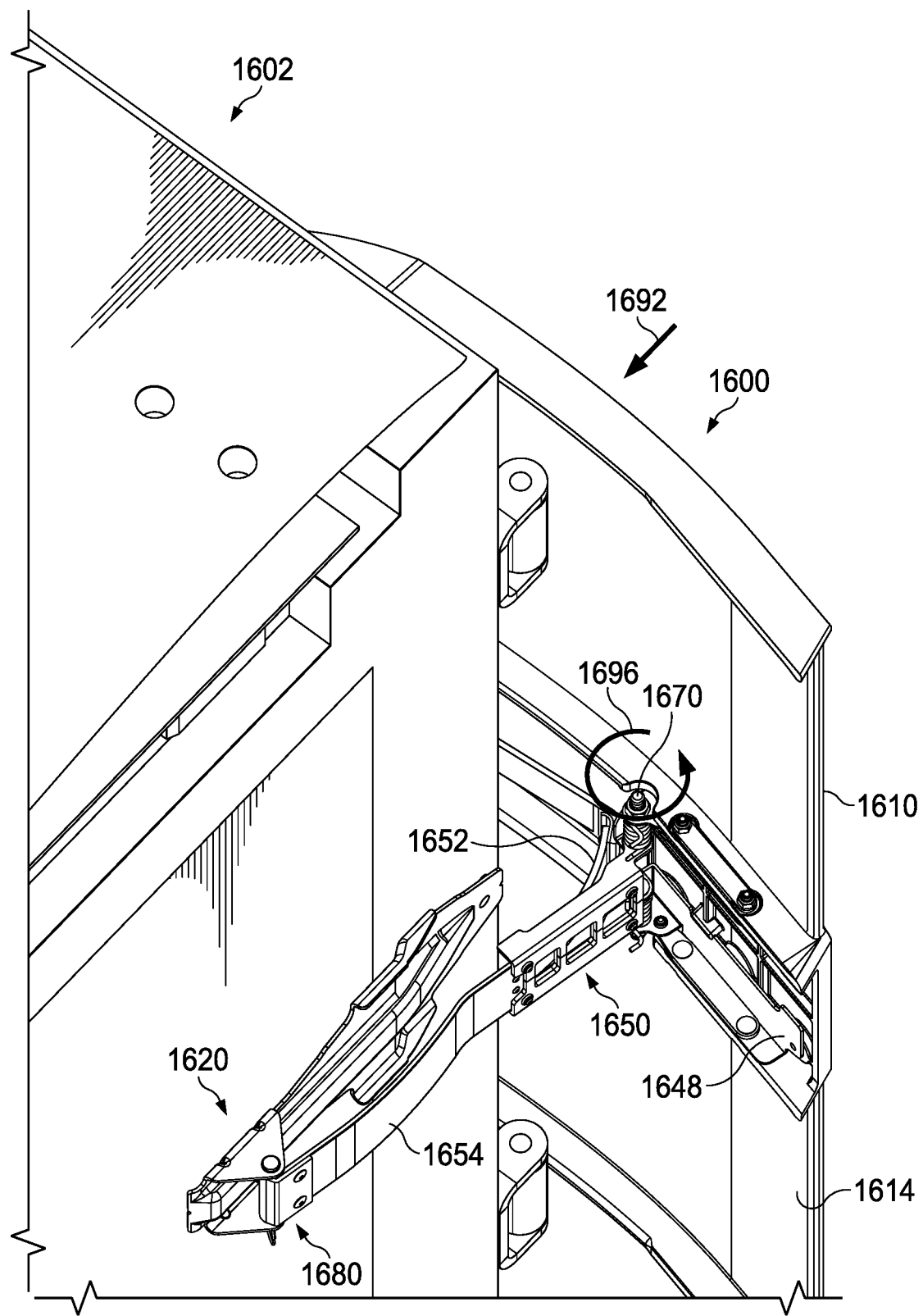
FIG. 22D is a partial rear perspective view of the aerodynamic device and flexible mounting system installed on a trailer in a retracted and hyperextended position.

FIG. 22C shows the aerodynamic device 1600 and flexible mounting system 1604 installed on a trailer 1602 in a retracted position. The retracted position occurs when an external force, shown by arrow 1686 (see FIG. 21), deflects the aerodynamic device 1600 inwardly from the operating position, toward the centerline of the trailer 1602. The deflection of the aerodynamic device 1600 inwardly causes the upper and lower rotary brackets 1646, 1648 to rotate about the fasteners 1670 (as shown by arrow 1688) to move the end of the upper and lower rotary brackets 1646, 1648 opposite of the fasteners 1670 away from the hinge plate 1650 as shown by arrow 1690. The external force and deflection of the aerodynamic device 1600 inwardly causes the trailing edge 1612 of the aerodynamic device to rotate toward the trailer door 1628. While not shown in FIG. 22C, in the retracted position, the resilient spring 1652 is not deflected.

FIG. 22D shows the aerodynamic device 1600 and flexible mounting system 1604 installed on a trailer 1602 in a retracted and hyperextended position. The hyperextended position occurs when an external force, shown by arrow 1692, deflects the aerodynamic device 1600 from the retracted position, toward the trailer door 1628. The deflection of the aerodynamic device 1600 towards the trailer door 1628 causes the upper and lower rotary brackets 1646, 1648 to rotate further about the fasteners 1670 (as shown by arrow 1696) to move the end of the upper and lower rotary brackets 1646, 1648 opposite of the fasteners 1670 further away from the hinge plate 1650. The further rotation and the deflection of the aerodynamic device 1600 towards the trailer door 1628 causes the hinge arm 1654 to rotate about the trailer hinge 1620 away from the side of the trailer 1602 thereby causing the resilient spring 1652 to deflect. The deflection of the resilient spring 1652 allows the aerodynamic device 1600 to move without causing the flexible mounting system 1604 to fail.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to a preferred embodiment. However, changes and modifications may be made to the preferred embodiment without departing from the scope of the present technology. These and other changes or modifications are intended to be included within the scope of the present technology, as expressed in the following claims.

The invention claimed is:

1. An aerodynamic device for attachment to a trailer of a tractor-trailer having a centerline, a trailer sidewall and a trailer door, the aerodynamic device comprising:
   an airfoil comprising a leading edge, a trailing edge, an inner surface, and an outer surface;
   a flexible mounting system comprising:
      a door hinge coupled to the trailer door;
      a mounting bracket comprising:
         upper and lower rotary brackets coupled to the inner surface of the airfoil;
         a hinge plate coupled to a first end of the upper and lower rotary brackets;
         a hinge arm coupled to the hinge plate at a first end and the trailer hinge at a second end; and
         a resilient spring coupled to the hinge arm at a first end and the door strap at a second end;
      a trailer hinge coupled to the mounting bracket and the trailer sidewall; and
      a door strap coupled to the door hinge at a first end and the mounting bracket at a second end.

2. The aerodynamic device of claim 1, wherein the airfoil further comprises a mounting channel having a pair of spaced apart stiffeners located on the inner surface.

3. The aerodynamic device of claim 2, wherein each of the upper and lower rotary brackets comprise a hinge and a mounting flange.

4. The aerodynamic device of claim 3, wherein the mounting flange of the upper and lower rotary brackets are coupled to the pair of spaced apart stiffeners of the mounting channel.

5. The aerodynamic device of claim 1, wherein the hinge plate comprises a central portion and a pair of depending flanges.

6. The aerodynamic device of claim 5, wherein each hinge on the upper and lower rotary brackets are rotatably coupled to one of the pair of depending flanges on the hinge plate.

7. The aerodynamic device of claim 5, wherein the hinge arm is coupled to the central portion of the hinge plate at the first end and the trailer hinge at the second end.

8. The aerodynamic device of claim 1, wherein the door hinge comprises:
   a bracket coupled to the door; and
   a lever arm comprising an end rotatably coupled to the bracket and a mounting plate coupled to the first end of the door strap.

9. A aerodynamic device for attachment to a trailer of a tractor-trailer having a centerline, a trailer sidewall and a trailer door, the aerodynamic device comprising:
   an airfoil comprising a leading edge, a trailing edge, an inner surface, and an outer surface;
   a flexible mounting system comprising:
      a door hinge coupled to the trailer door;
      a mounting bracket comprising:
         upper and lower rotary brackets coupled to the inner surface of the airfoil;
         a hinge plate rotatably coupled to a first end of the upper and lower rotary brackets;
         a hinge arm having first and second ends, wherein the first end is coupled to the hinge plate; and
         a resilient spring having first and second ends, wherein the first end of the resilient spring is coupled to a mounting portion of the hinge plate; and
      a trailer hinge coupled to the second end of the hinge arm and the trailer sidewall; and
      a door strap coupled to the door hinge at a first end and the second end of the resilient spring at a second end.

10. The aerodynamic device of claim 9, wherein the airfoil further comprises a mounting channel having a pair of spaced apart stiffeners located on the inner surface.

11. The aerodynamic device of claim 10, wherein each of the upper and lower rotary brackets comprise a hinge and a mounting flange.

12. The aerodynamic device of claim 11, wherein the mounting flange of the upper and lower rotary brackets are coupled to the mounting channel of the airfoil.

13. The aerodynamic device of claim 9, wherein the hinge plate comprises a central portion and a pair of depending flanges.

14. The aerodynamic device of claim 13, wherein each hinge on the upper and lower rotary brackets are rotatable coupled to one of the pair of depending flanges on the hinge plate.

15. The aerodynamic device of claim 14, wherein the hinge arm is coupled to the central portion of the hinge plate at the first end and the trailer hinge at the second end.

16. The aerodynamic device of claim 15, wherein the door hinge comprises:
 a bracket coupled to the door; and
 a lever arm comprising an end rotatably coupled to the bracket and a mounting plate coupled to the first end of the door strap.

* * * * *